(12) United States Patent
Yoshida et al.

(10) Patent No.: US 7,720,000 B2
(45) Date of Patent: May 18, 2010

(54) NETWORK CONTROL APPARATUS, METHOD, AND PROGRAM

(75) Inventors: Atsushi Yoshida, Osaka (JP); Takao Yamaguchi, Osaka (JP); Katsuji Aoki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/375,872

(22) PCT Filed: Aug. 28, 2008

(86) PCT No.: PCT/JP2008/002333

§ 371 (c)(1),
(2), (4) Date: Jan. 30, 2009

(87) PCT Pub. No.: WO2009/028185

PCT Pub. Date: Mar. 5, 2009

(65) Prior Publication Data

US 2010/0067533 A1   Mar. 18, 2010

(30) Foreign Application Priority Data

Aug. 28, 2007   (JP) .............................. 2007-221780

(51) Int. Cl.
  *H04J 1/16*   (2006.01)
  *H04L 12/56*   (2006.01)
(52) U.S. Cl. ........................ 370/252; 370/315; 370/389; 370/401
(58) Field of Classification Search .................. 370/389, 370/315, 401, 252
See application file for complete search history.

(56) References Cited

U.S. PATENT DOCUMENTS

| 6,862,628 | B2 * | 3/2005 | Moore et al. ................. 709/236 |
| 7,299,038 | B2 | 11/2007 | Kennedy et al. |
| 2002/0194361 | A1 | 12/2002 | Itoh et al. |

(Continued)

FOREIGN PATENT DOCUMENTS

JP   2000-115245   4/2000

(Continued)

OTHER PUBLICATIONS

International Search Report issued Sep. 30, 2008 in the International (PCT) Application of which the present application is the U.S. National Stage.

(Continued)

*Primary Examiner*—John Pezzlo
(74) *Attorney, Agent, or Firm*—Wenderoth, Lind & Ponack, L.L.P.

(57) ABSTRACT

To enable network control (particularly, transmission band allocation) that excels in follow-up ability to follow changes in a network, locality, and responsiveness. A network control apparatus controls a wireless ad-hoc network and includes: a routing processing unit (402) which establishes routing within a wireless ad-hoc network using routing information including information regarding a local transmission quality within the wireless ad-hoc network; a routing processing unit (406) which obtains the information regarding the transmission quality from the routing information used for establishing the routing; and a bottleneck estimating unit (411) which estimates a relay apparatus as a bottleneck candidate, based on a distribution of plural transmission qualities within the wireless ad-hoc network, which are indicated by the obtained information.

10 Claims, 25 Drawing Sheets

U.S. PATENT DOCUMENTS

| | | |
|---|---|---|
| 2004/0219909 A1 | 11/2004 | Kennedy et al. |
| 2005/0262386 A1 | 11/2005 | Numanoi |
| 2005/0286426 A1 | 12/2005 | Padhye et al. |
| 2006/0153246 A1 | 7/2006 | Aoki et al. |
| 2006/0187942 A1 | 8/2006 | Mizutani et al. |

FOREIGN PATENT DOCUMENTS

| | | |
|---|---|---|
| JP | 2000-508500 | 7/2000 |
| JP | 2003-115858 | 4/2003 |
| JP | 2004-048478 | 2/2004 |
| JP | 2004-172719 | 6/2004 |
| JP | 2004-336768 | 11/2004 |
| JP | 2005-79827 | 3/2005 |
| JP | 2005-079827 | 3/2005 |
| JP | 3662907 | 6/2005 |
| JP | 2005-309748 | 11/2005 |
| JP | 2005-328458 | 11/2005 |
| JP | 2006-020302 | 1/2006 |
| JP | 2006-074720 | 3/2006 |
| JP | 2006-186829 | 7/2006 |
| JP | 2006-237678 | 9/2006 |
| JP | 2007-068043 | 3/2007 |
| WO | 98/31156 | 7/1998 |
| WO | 02/25878 | 3/2002 |

OTHER PUBLICATIONS

Yuji Waizumi et al. "*Dynamic Mirror Server Selection Method with Consideration about Congestion of Link*", IPSJ Journal, vol. 45, No. 1, pp. 65-73, Jan. 2004.

Hitomi Takahashi et al. "*A Routing Scheme for Maximizing TCP Throughout in Mobile Ad-Hoc Networks*", Computer System Synposium, IPSJ Symposium Series vol. 2001, No. 16, pp. 9-16, Nov. 2001.

Shiro Sakata et al., "*Mobile Ad Hoc Networks and Wireless LAN Mesh Networks*", The Institute of Electronics, Information and Communication Engineers Transactions on Communications: B, vol. J89-B, No. 6, pp. 811-823, Jun. 2006.

IEEE 802.11-06/0328r0, Feb. 2006.

Masahiro Morikura et al. "*802.11 High-speed Wireless LAN Textbook*", Impress, pp. 152-155, Jan. 2005.

\* cited by examiner (a)

| Parameter | Value (802.11a) | Value (802.11b) | Description |
|---|---|---|---|
| $O_{ca}$ | 75 μs | 335 μs | Channel access overhead |
| $O_p$ | 110 μs | 364 μs | Protocol overhead |
| $B_t$ | 8224 | 8224 | Number of bits for test frame |

(b) Congestion level table

| Node identification number | Congestion level |
|---|---|
| A | 20 |
| B | 11 |
| C | 14 |
| D | 3 |
| ... | ... |
| N | 20 |

(a) Transmission error rate table

| Link identification number | Transmission error rate |
|---|---|
| 1 | 2% |
| 2 | 15% |
| 3 | 3% |
| 4 | 4% |
| ... | ... |
| N | 2% |

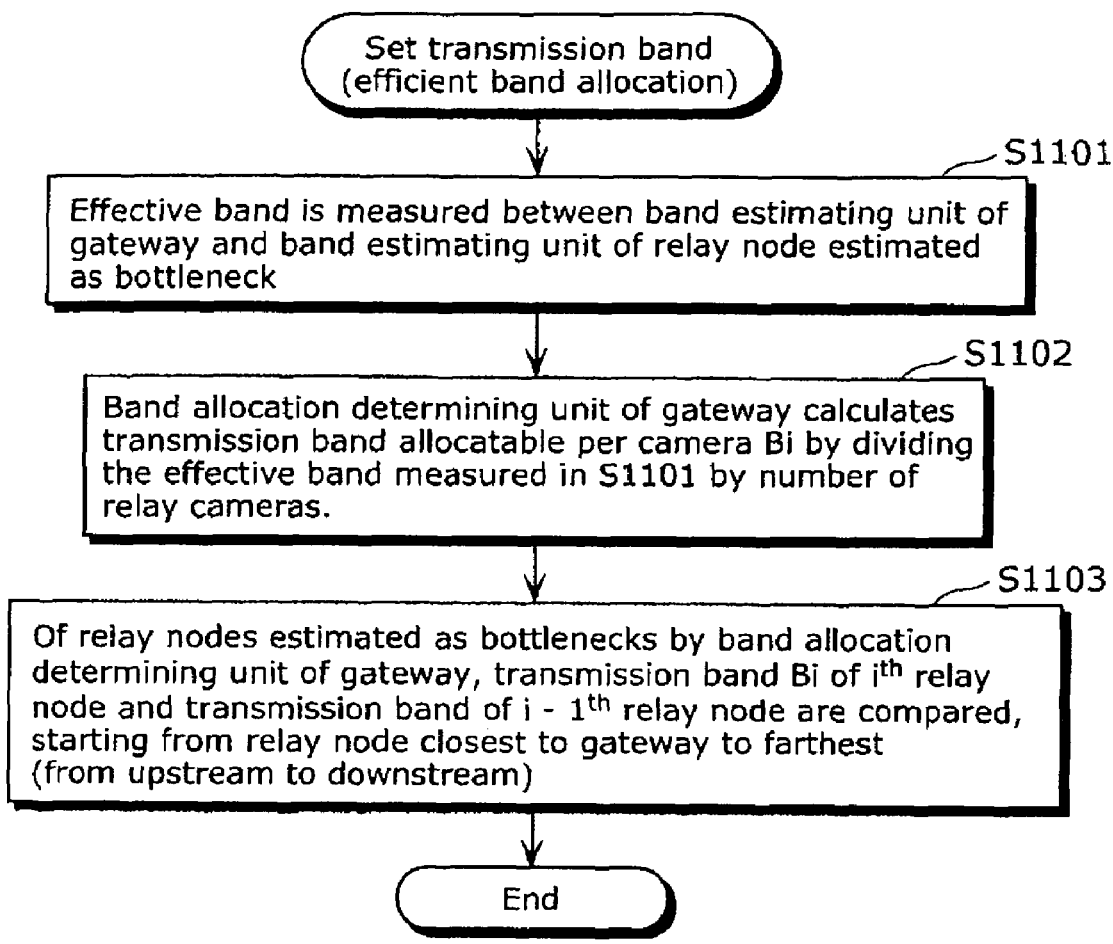

FIG. 13

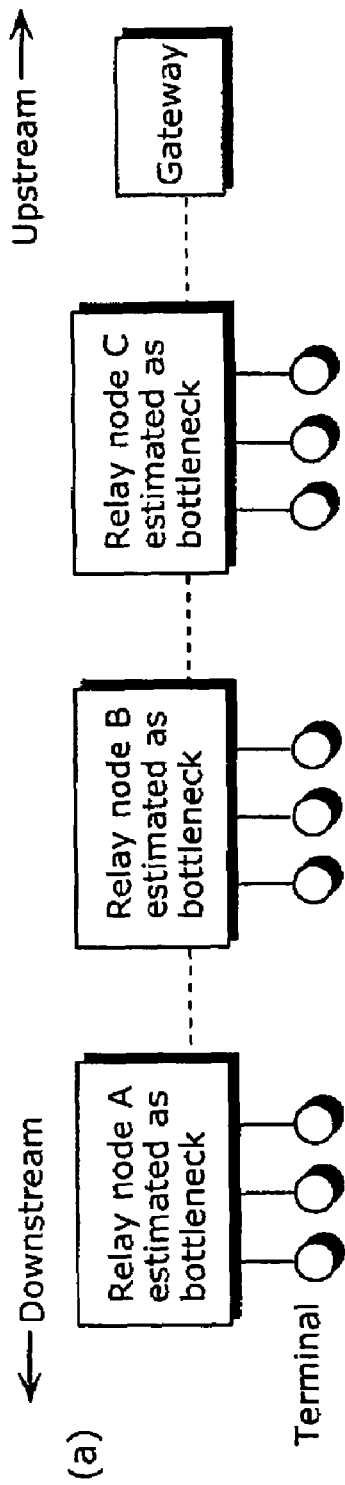

(a) Downstream ← → Upstream

Relay node A estimated as bottleneck — Relay node B estimated as bottleneck — Relay node C estimated as bottleneck — Gateway Terminal (b)

| | A | B | C |
|---|---|---|---|
| Number of terminals (number of cameras) directly connected to relay node | 3 | 3 | 3 |
| Number of terminals (number of cameras) from which data is relayed by relay node | 3 | 6 | 9 |
| Effective speed between gateway and relay node | 10 | 15 | 25 |
| Transmission band that relay node can allocate per camera | 10/3 (3.3) | 15/6 (2.5) | 25/9 (2.8) |

FIG. 14
(a) Before routing change
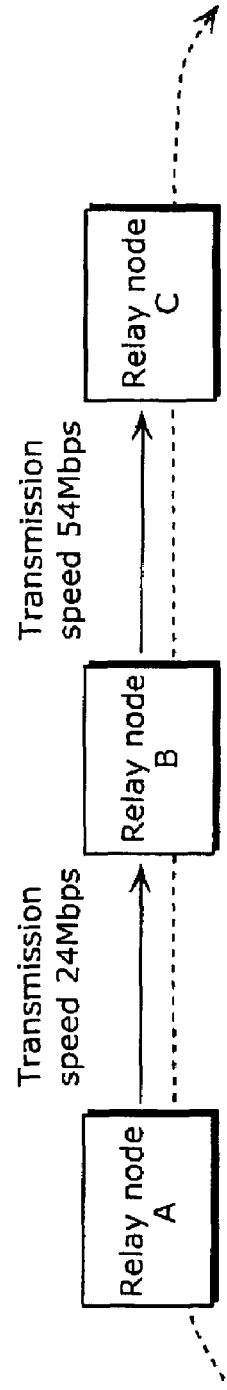
(b) After routing change
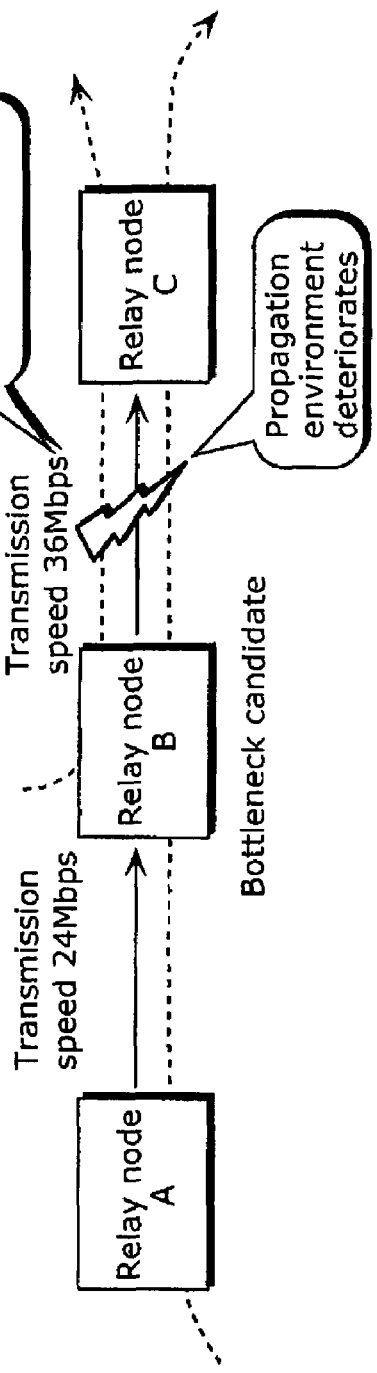

FIG. 16

Transmission speed table

| Link identification number | Measurement time | Transmission speed |
|---|---|---|
| 1 | July 7, 2007 12:15:29 | 54Mbps |
| 2 | July 7, 2007 12: 15:29 | 48Mbps |
| 3 | July 7, 2007 12:14:59 | 6Mbps |
| 4 | July 7, 2007 12:15:20 | 24Mbps |
| ⋮ | ⋮ | ⋮ |
| N | July 7, 2007 12:15:28 | 36Mbps |

NETWORK CONTROL APPARATUS, METHOD, AND PROGRAM

TECHNICAL FIELD

The present invention relates to a technique for performing allocation of an appropriate transmission band between nodes making up an ad-hoc network.

BACKGROUND ART

Conventionally, a wireless ad-hoc network and a wired network are connected to each other at a gateway, and data is transmitted from plural sending terminals connected to the wireless ad-hoc network to respective receiving terminals connected to the wired network.

In the transmission, an effective band available for the data transmission between each of the sending and receiving terminals depends on routing from the sending terminal to the gateway and the network status, thus resulting in unfairness among the sending terminals.

In order to reduce such unfairness, various techniques are known for securing fairness in transmission band among plural sending terminals connected to the wireless ad-hoc network (for example, see Patent References 1 to 6).

Patent Reference 1 discloses a technique for detecting a bottleneck in the transmission band, which is generated at a relay node in the wireless ad-hoc network, so as to decrease a transmission rate at a source apparatus.

In addition, Patent Reference 2 discloses a technique for searching packet content at each relay node and scheduling an order of transmitting each packet.

In addition, Patent Reference 3 discloses a technique for prorating, at each relay node, a transmission band available for the relay node according to the number of terminals that are relayed (subordinate terminals) so as to achieve a fair data transmission amount among the subordinate terminals.

In addition, for a method of controlling the transmission amount for the sending terminals according to a communication band on a transmission path, Patent Reference 4 discloses a technique for estimating the transmission band for the communication network at a receiving side and indicating, to the sending terminals, the data transmission amount based on the estimated transmission band.

In addition, Patent Reference 5 discloses a technique for optimizing an update frequency of routing information by increasing the update frequency between unstable nodes or links, and decreasing, conversely, the update frequency between stable nodes or links. Patent Reference 5 further discloses a technique for estimating, at each relay node, stability (fault tolerance) of the nodes and links on the transmission path.

In addition, Patent Reference 6 discloses a technique for detecting a bottleneck link on the transmission path by obtaining, one by one, band information of each link between a sending terminal and a relay node, between relay nodes, and between a relay node and a receiving terminal, so as to perform transmission and reception according to the band of the detected link.

Patent Reference 1: Japanese Unexamined Patent Application Publication No. 2005-328458
Patent Reference 2: Japanese Unexamined Patent Application Publication No. 2006-74720
Patent Reference 3: Japanese Unexamined Patent Application Publication No. 2004-172719
Patent Reference 4: Japanese Unexamined Patent Application Publication No. 2000-115245
Patent Reference 5: Japanese Unexamined Patent Application Publication No. 2004-336768
Patent Reference 6: Japanese Patent No. 3662907

DISCLOSURE OF INVENTION

Problems that Invention is to Solve

Although the conventional technology described above allows securing a transmission band, which is fair at some level, among the plural sending terminals connected to a wireless ad-hoc network, the following problems remain unsolved.

Problem 1: in the wireless ad-hoc network, the location and size of a bottleneck generated in the transmission band on a transmission path change with time as a result of addition or deletion of a terminal or a relay node, variation in radio wave propagation characteristics between relay nodes, and so on.

Therefore, it is not possible to maintain fairness in quality of service (QoS) in communication or efficient allocation of the transmission band, only by prorating a transmission band to each terminal according to the transmission band at a previously-identified bottleneck on the transmission path. That is, there is no follow-up ability to follow changes in the network.

Problem 2: when each relay node estimates the stability on the transmission path, a less-stable node or link that is estimated as the bottleneck differs depending on the relay node performing the estimation.

Therefore, each individual relay node cannot judge whether or not the bottleneck, which the relay node has estimated, is the bottleneck for the entire network. That is, such bottleneck estimation lacks globality.

Problem 3: when measuring, one by one, the transmission band for each individual link connecting relay nodes on the wireless ad-hoc network, the measurement requires larger amounts of communication traffic and throughput.

Therefore, the processing requires a longer period of time, starting from generation of a bottleneck, to identifying the bottleneck, and to setting the band for the sending terminals or the relay nodes (communication speed setting). That is, responsiveness is low.

Furthermore, in the bottleneck detection performed by the plural sending terminals for the purpose of allocating the transmission band, it is required to identify the position of the bottleneck before the data is transmitted from each of the plural sending terminals (before congestion occurs at the bottleneck).

The present invention is conceived for solving these problems, and it is an object of the present invention to enable network control (particularly transmission band allocation) that excels in follow-up ability to follow changes in the network, globality, and responsiveness.

Means to Solve the Problems

In order to achieve the above object, the network control apparatus of the present invention is a network control apparatus controlling, in an ad-hoc network structured with a terminal apparatus, a relay apparatus, and a gateway apparatus connected to each other through data links, the ad-hoc network through which data is transferred from the terminal apparatus to the gateway apparatus via the relay apparatus, wherein routing in the ad-hoc network is established using routing information including information regarding a transmission error rate at each of the data links, and the network control apparatus includes: a routing processing unit which obtains, from the routing information, information regarding a relationship between data links in connecting relay apparatuses on a path and information regarding the transmission error rate at each of the data links; and a bottleneck estimating unit which estimates a relay apparatus as a bottleneck candidate from among the relay apparatuses, the relay apparatus having a data link through which the data is transmitted and at which the transmission error rate is higher than the transmission error rate at a data link through which the data is received.

In addition, in the network control apparatus, routing in the ad-hoc network is established using routing information including information regarding a congestion level at the relay apparatus, and the routing processing unit may obtain, from the routing information, information regarding a relationship between data links in connecting relay apparatuses on a path and information regarding the congestion level at the relay apparatuses; and the bottleneck estimating unit may estimate a relay apparatus as a bottleneck candidate from among the relay apparatuses, the relay apparatus having the congestion level higher than the congestion level at any other relay apparatus with which the relay apparatus is connected through a data link.

According to this configuration, since the bottleneck is estimated by using information regarding transmission quality included in the routing information used for establishing the routing within the ad-hoc network, it is possible to estimate a new bottleneck each time the routing is established. Such information regarding the transmission quality is a kind of metric used for establishing ad-hoc routing, such as the transmission error rate at each link and the congestion level at each relay apparatus, for example, and therefore makes it possible to collect from the entire network the latest information in which the result of the routing establishment is reflected.

The network apparatus according to the present invention estimates the bottleneck using such information relating to the transmission quality, and therefore enables bottleneck estimation that excels in both follow-up ability to follow changes in the ad-hoc network and globality.

In addition, the network control apparatus of the present invention may further include: an effective band measuring unit which measures an effective band that is a communication band allowing transmission of the data from the relay apparatus estimated as the bottleneck candidate to the gateway apparatus; and a band allocation determining unit which determines, by dividing the measured effective band, a transmission band to be allocated to one or more other terminal apparatuses from which the relay apparatus relays the data.

According to this configuration, it is possible to perform, only on a relay node estimated as the bottleneck, measurement of an effective band for a route to the gateway and allocate an effective band to each terminal apparatus by dividing the measured effective band. This allows reducing the amounts of communication traffic and throughput required for measuring the effective band, and enables, as a result, transmission band allocation that excels in responsiveness.

Note that the present invention can be implemented not only as such a network control apparatus but also as a gateway apparatus. Furthermore, the present invention can also be implemented as a control method for controlling the network, a program causing a computer to execute the control method, and a storage medium for storing the program.

Effects of the Invention

As described above, the network control apparatus according to the present invention estimates a bottleneck by use of routing information that is used for establishing ad-hoc routing, thus enabling bottleneck estimation that excels in both follow-up ability to follow changes in an ad-hoc network and globality. In addition, it is possible to perform, only on a relay apparatus estimated as the bottleneck, measurement of an effective band for the route to the gateway and allocate an effective band to each terminal apparatus by dividing the measured effective band, thus enabling transmission band allocation that excels in responsiveness.

As a result, in the wireless ad-hoc network, it becomes possible to automate transmission band allocation in which fairness among terminals is secured, and efficient transmission band allocation over the entire wireless ad-hoc network.

With this, even when there are a large number of terminals to be controlled and resetting of the transmission band is necessary as a result of addition and deletion of a terminal or a network, no complicated manual band settings for the terminals and the relay nodes (setting of the communication speed) are required, thus reducing setting operations.

In addition, when packet loss occurs due to a transmission error caused by variation in radio wave propagation characteristics between relay nodes relaying from the sending terminal to the gateway, or when a bottleneck is generated on the transmission path due to congestion caused by the traffic flowing into a relay node located on the way or by packet loss, it is possible for each terminal to automatically maintain fairness in quality of service (QoS) in communication and efficient allocation of the transmission band.

In addition, particularly, in estimating the bottleneck by comparing transmission error rates at data links, which are obtained from the routing information, it is possible to measure an effective band for the bottleneck in the wireless ad-hock network and allocate bands to plural sending terminals according to the effective band, thus allowing transmission of the traffic data without causing any deterioration in transmission quality, such as packet loss or delays due to congestion.

BRIEF DESCRIPTION OF DRAWINGS

FIG. 6(a) is a diagram showing an example of a transmission error rate table, and FIG. 6(b) is a diagram showing an example of a congestion level table.

FIG. 11 is a flowchart showing an example of processing for efficient automatic allocation of the transmission band to the terminals and the relay nodes.

FIG. 12 is a diagram showing an example of a program code for executing step S1103.

FIGS. 13(a) and (b) is a diagram for describing a specific example of efficient allocation of the transmission band to to each camera.

FIGS. 14(a) and (b) is a diagram for describing deterioration in propagation characteristics and decrease in transmission speed occurring on a transmission path caused by routing change.

FIG. 16 is a diagram showing an example of a transmission speed table.

NUMERICAL REFERENCES

Figure 1:
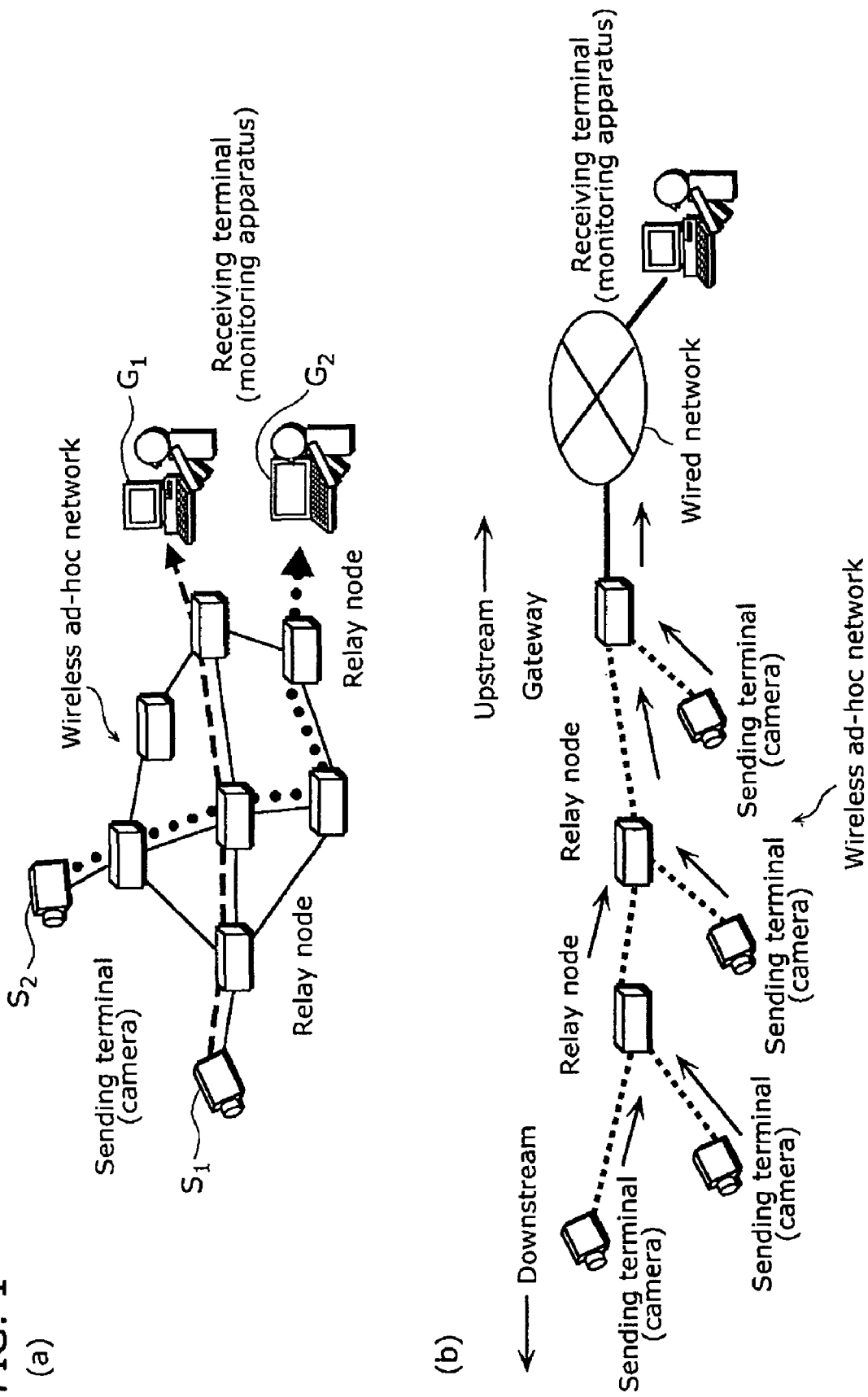
FIG. 1(a) is a conceptual diagram showing, as an example, a configuration of a wireless ad-hoc network in general.
FIG. 1(b) is a conceptual diagram showing a configuration of the network according to the present invention.

40, 41 Network control apparatus
401, 405 Band estimating unit
402, 406 Routing processing unit
403, 413 Band allocation determining unit
404 Gateway control unit
407 Relay node control unit
408 Transmission rate control unit
409 Data generating unit
410 Terminal control unit
411, 412 Bottleneck estimating unit
1801 Display screen
1802 Band resetting button
1803 Operation panel
1901 In-vehicle camera
1902 Relay apparatus
1903 Live image
1904 Map information

BEST MODE FOR CARRYING OUT THE INVENTION

Hereinafter, embodiments of the present invention shall be described with reference to the drawings.

<Network Configuration According to the Present Invention>

First, a network configuration according to the present invention shall be described.

FIG. 1(a) is a conceptual diagram showing, as an example, a configuration of a wireless ad-hoc network in general.

Relay nodes, and cameras S1 and S2 that are sending terminals, are connected to each other through plural wireless data links. In this wireless ad-hoc network, data is transmitted from the cameras S1 and S2 to monitoring apparatuses G1 and G2 that are receiving terminals.

FIG. 1(b) is a conceptual diagram showing a configuration of the network according to the present invention.

The data sent from plural cameras that are sending terminals is transmitted across the wireless ad-hoc network, and is further transmitted to a monitoring apparatus that is a receiving terminal via a wired network connected to the wireless ad-hoc network at a gateway.

Note that the network according to the present invention may include one or more receiving terminals.

In addition, types of transmission media for implementing the wireless ad-hoc network and the wired network are not limited. For transmission media, it is possible to select one, for example, from among known transmission media such as optical fiber, coaxial cable, twisted pair cable, radio wave, and infrared ray.

Unlike a general wireless ad-hoc network having a mesh structure (FIG. 1(a)), the wireless ad-hoc network according to the present invention is structured in a tree-like shape, with a gateway that is a route node and a sending terminal that is a leaf node being connected to each other through plural wireless data links. Hereinafter, the description shall be given, assuming, in this wireless ad-hoc network, a direction toward the gateway as upstream and a direction toward the sending terminal as downstream.

For routing protocol for the wireless ad-hoc network, it is possible to use a routing method such as Ad hoc On-Demand to Distance Vector (AODV) and Optimized Link State Routing (OLSR) that are known, or a routing method of IEEE802.11s which has expanded these methods to wireless transmission.

Various apparatuses can be assumed as the sending terminal and receiving terminal, for example, a camera, a handheld terminal, an IP phone, a car navigation, a television, and so on.

The relay node may be a wireless relay apparatus that is installed to be stationary, and may also be a wireless relay apparatus equipped on a moving object, which is used for inter-vehicle communication.

Next, the problems that the present invention is to solve shall be described by using, as a specific example, the network configured as described above.

Figure 2:
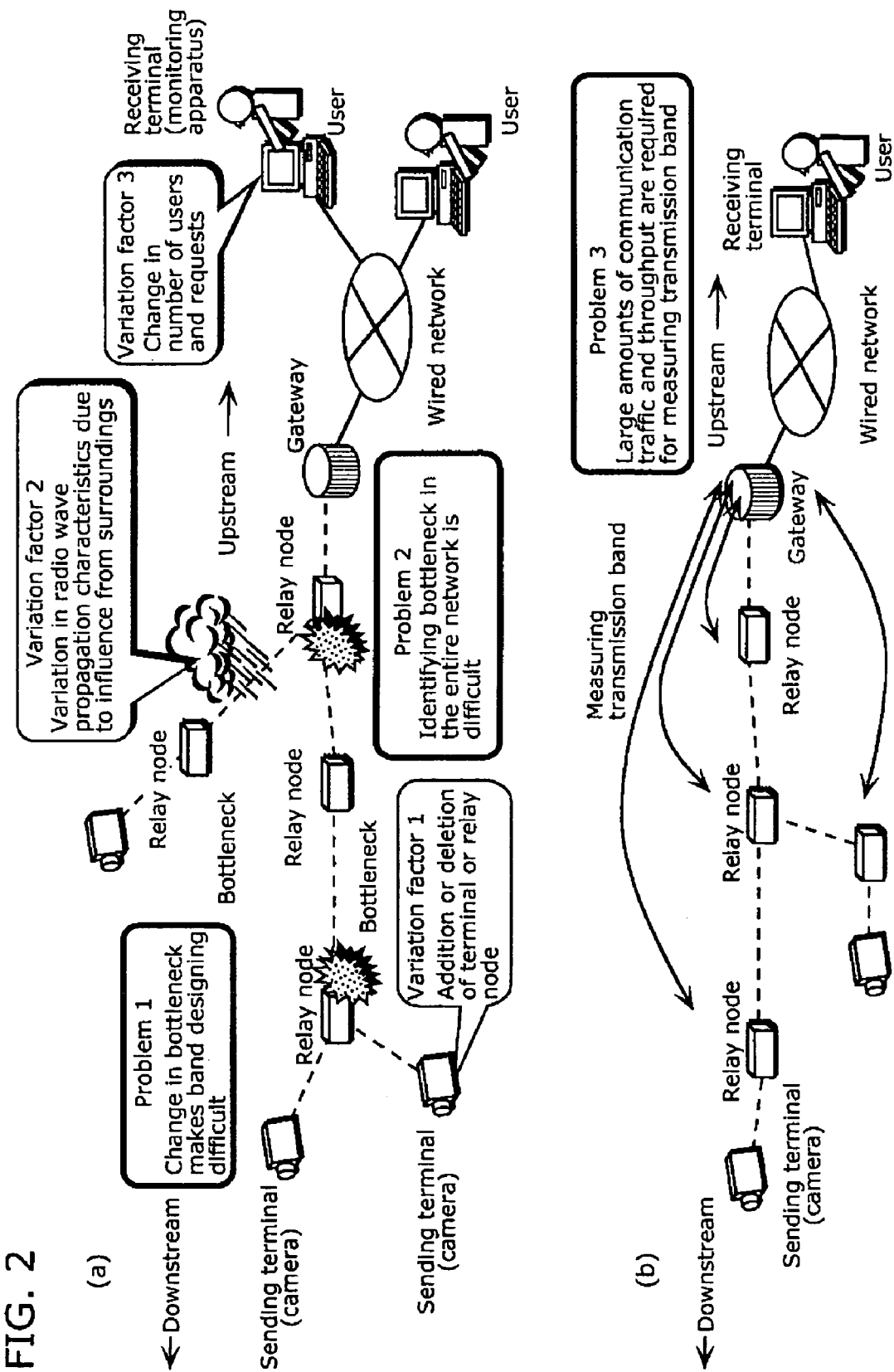
FIGS. 2(a) and (b) is a diagram for describing problems to be solved by the present invention.

FIGS. 2(a) and (b) is a diagram for describing the problems that are to be solved by the present invention.

First, in the present invention, a transmission band bottleneck in the wireless ad-hoc network shall be defined as follows.

In the wireless ad-hoc network, the available transmission bandwidth differs according to the data link (hereinafter, also simply referred to as link), depending on the degree of congestion at the relay node and occurrence frequency of transmission errors at the data link connecting relay nodes.

Therefore, in the network shown in FIGS. 2(a) and (b), a relay node, at which the transmission band for a link connecting the relay node with a relay node or the gateway located upstream (upstream link) is narrower than the transmission band for a link connecting the relay node with a sending terminal or a relay node located downstream (downstream link), is defined as the transmission band bottleneck on the transmission path.

The network control apparatus of the present invention overcomes three difficulties in estimating the bottleneck in the network shown in FIGS. 2(a) and (b) and allocating appropriate transmission bands among plural sending terminals.

The first difficulty is difficulty in previously designing an appropriate amount of transmission for a sending terminal according to the location and degree of the bottleneck, due to variation with time of the place and size of the bottleneck generated in the transmission band on the transmission path.

Such variation of the bottleneck derives from: variation of the network topology due to addition or deletion of a terminal or a relay node (variation factor 1); variation in radio wave propagation characteristics between relay nodes caused by change in surrounding environment (variation factor 2); and variation in traffic volume caused by change in the number of users and the contents of requests at the receiving-terminal side (variation factor 3) (FIG. 2(a)).

In addition, when allocating an appropriate transmission band to plural sending terminals, it is preferable that not only the change of bottleneck be appropriately followed but also the bottleneck be identified before each sending terminal starts sending the data (before congestion is generated at the bottleneck).

The second difficulty is that: when each relay node estimates, as the bottleneck, another relay node or a link that is an obstacle to stable transmission of the data transmitted from the relay node to a destination (that is, having a high possibility that the data transmission will be interrupted, and having a low stability), different bottlenecks are estimated because the route and range with which to estimate the stability differs according to each relay node.

Therefore, each individual relay node cannot judge whether or not the bottleneck, estimated by the relay node itself, is a bottleneck that influences the stability of the entire network (FIG. 2(a)).

The third difficulty is that: in the wireless ad-hoc network, in the case of measuring, one by one, the transmission band for the links connecting the relay nodes in order to identify the location of the bottleneck on the transmission path, larger amounts of transmission and throughput are required for identifying the transmission-band bottleneck.

Therefore, it takes a long time until the band is set (communication speed is set) for the sending terminals and the relay nodes, after a lapse of time from the generation of the bottleneck to the identification of the bottleneck (FIG. 2(b)).

Hereinafter, the network control apparatus configured to overcome these difficulties shall be described.

First Embodiment

Figure 3:
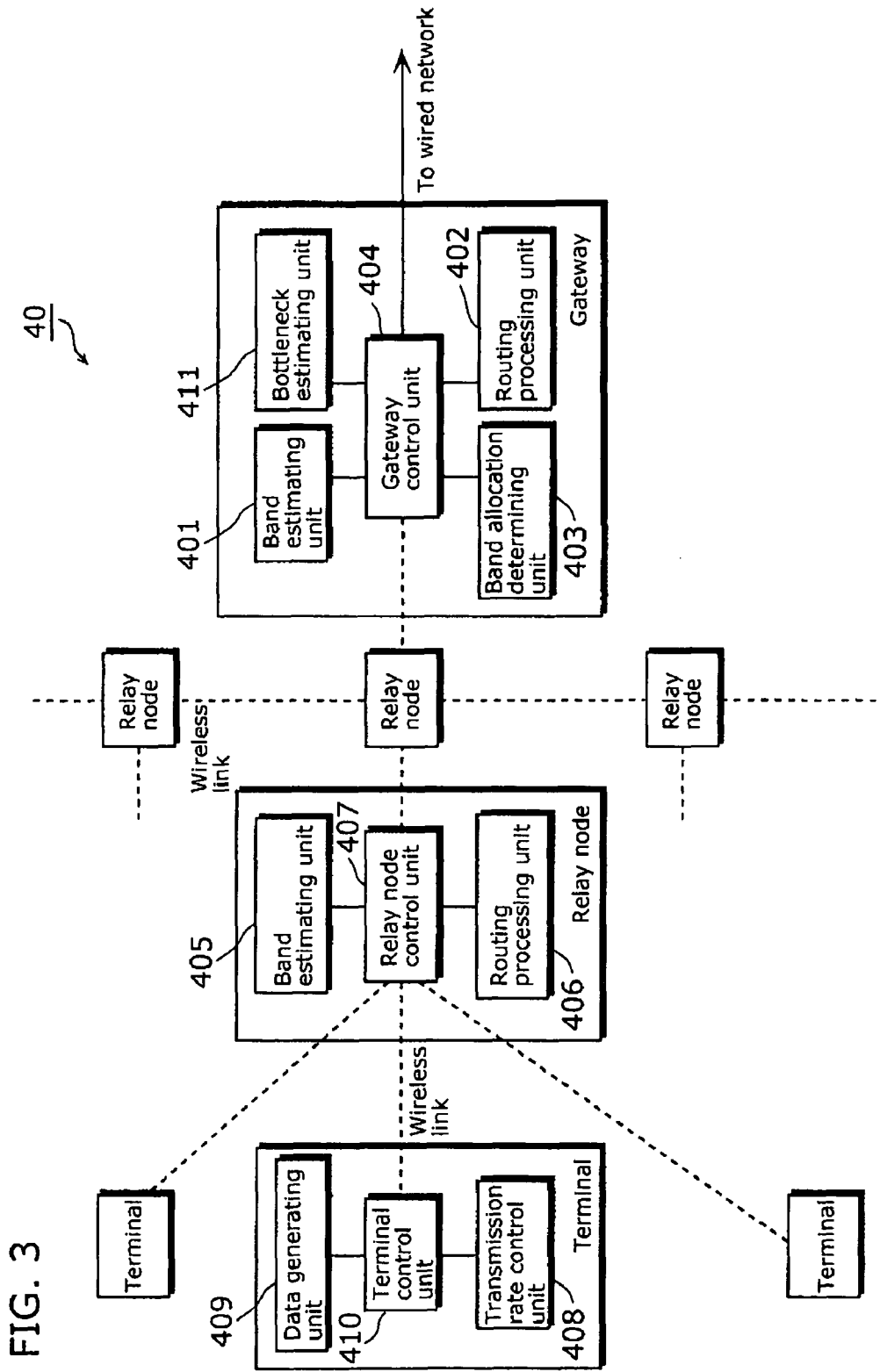
FIG. 3 is a functional block diagram showing an example of a configuration of a network control apparatus in a first embodiment.

FIG. 3 is a functional block diagram showing an example of a configuration of a network control apparatus 40 in a first embodiment.

The network control apparatus 40 is dispersedly provided in: a gateway, a relay node, and a terminal making up a wireless ad-hoc network portion of the network system (FIG. 1(b)). The wireless ad-hoc network is controlled by the network control apparatus 40 of the present invention. The network control apparatus 40 may also be dispersedly provided in plural relay nodes having an identical structure and plural terminals having an identical structure.

Hereinafter, a major portion of the network control apparatus 40 that is dispersed in the gateway, the relay node, and the terminal shall be described.

The gateway includes: a band estimating unit 401, a routing processing unit 402, a bottleneck estimating unit 411, a band allocation determining unit 403, and a gateway control unit 404, which function as the network control apparatus 40.

The band estimating unit 401 estimates an effective band between a relay node and the gateway through a link represented by a dotted line.

The routing processing unit 402 establishes ad-hoc routing between the gateway and the plural relay nodes, and obtains, from routing information used for the routing establishment, a relationship between the data links in connecting the plural relay nodes on the path, and information regarding transmission errors at the respective data links or information regarding congestion.

The bottleneck estimating unit 411 estimates the location of the bottleneck on the transmission path based on the distribution of transmission errors or congestion levels on the wireless ad-hoc network, using the information collected by the routing processing unit 402.

The band allocation determining unit 403 determines a transmission rate for each terminal and an allocation of the transmission band to each relay node, based on the number of the terminals connected to each relay node and the result of the estimation of the effective band for a route from a relay node to be the bottleneck to the gateway.

The gateway control unit 404 controls each of these units.

Here, the routing processing unit 402 may use, for a method of establishing the routing, a routing method such as AODV and OLSR that are conventional techniques, or a routing method in accordance with IEEE802.11s, which has expanded these methods to wireless transmission.

The relay node includes: a band estimating unit 405, a routing processing unit 406, and a relay node control unit 407, which function as the network control apparatus 40.

The band estimating unit 405 estimates the effective band between the relay node and the gateway.

The routing processing unit 406 establishes ad-hoc routing between relay nodes including the gateway.

The relay node control unit 407 controls each of these units.

The terminal includes: a data generating unit 409, a transmission rate control unit 408, and a terminal control unit 410, which function as the network control apparatus 40.

The data generating unit 409 generates the data to be transmitted.

The transmission rate control unit 408 determines a transmission rate for the data.

The terminal control unit 410 controls each of these units.

The terminal is connected to the relay node through a wireless link. Between the gateway and the plural relay nodes, a network is established using ad-hoc routing. The terminal transmits the data, through the gateway, to a receiving terminal connected to the wired network outside the diagram.

Specifically, the terminal may be a sensor device such as a camera or a microphone, or a server distributing storage contents such as video or Web contents.

In the network control apparatus 40 thus configured, the bottleneck estimating unit 411 is an example of the bottleneck estimating unit of the present invention, the band estimating unit 401 is an example of the effective band measuring unit of the present invention, and the band allocation determining unit 403 is an example of the band allocation determining unit of the present invention.

<Operation of the Network Control Apparatus>

Figure 4:
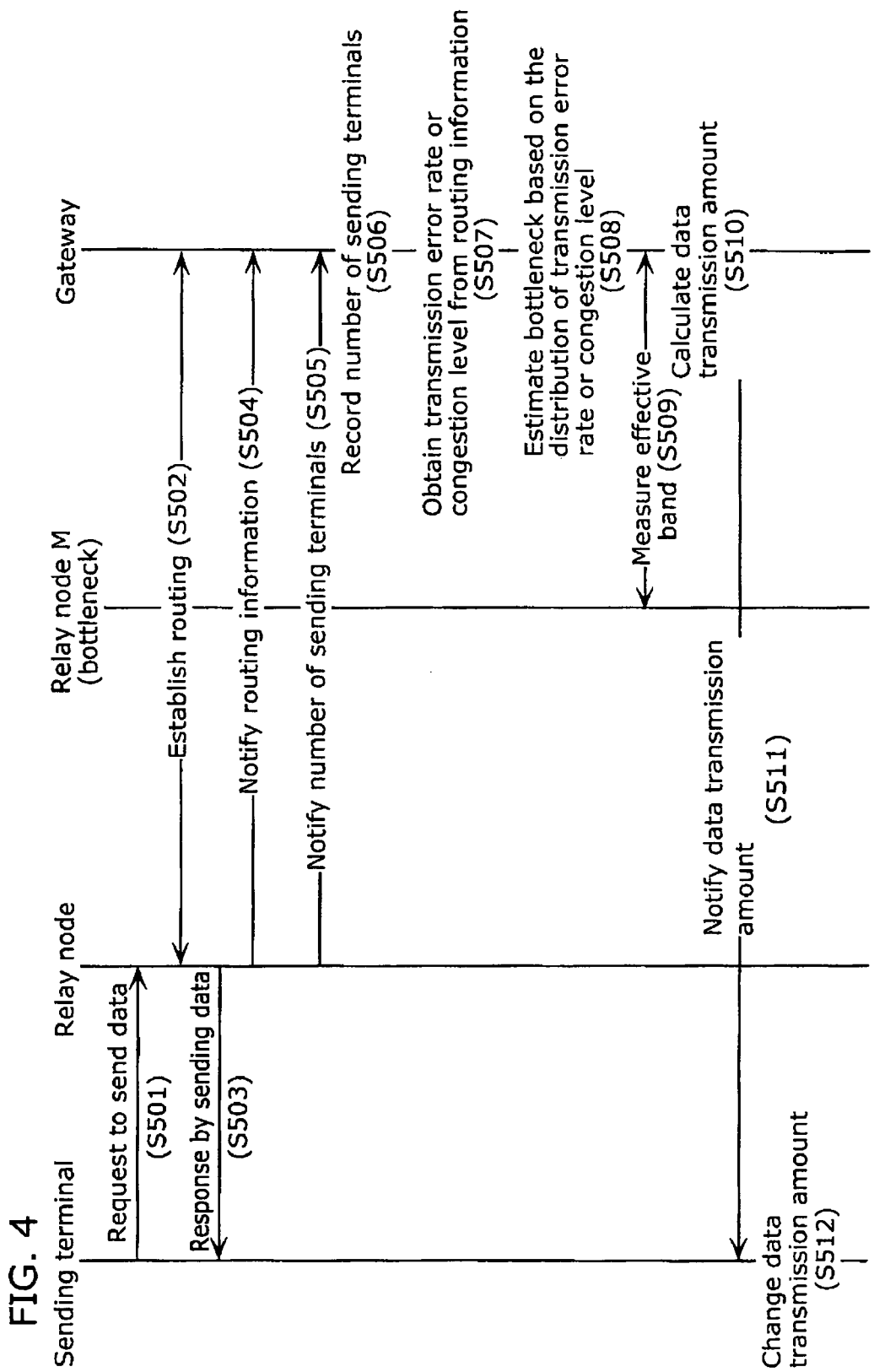
FIG. 4 is a sequence chart showing an example of an operation of the network control apparatus in the first embodiment.

FIG. 4 is a sequence chart showing an example of the operation of the network control apparatus 40. This operation, performed by a terminal, a relay node, and the gateway cooperatively operating as the network control apparatus 40, includes processing, which is characteristic of the network control apparatus 40, for estimating the bottleneck from the distribution of transmission errors or congestion levels used for the establishment of the ad-hoc routing in the network.

To start data transmission, the terminal causes a terminal control unit 410 to transmit a request to send data to one of peripheral relay nodes (S501).

Here, the terminal may transmit the request to send data to a relay node predetermined by a user (static allocation of the destination), or may also select a relay node at which radio wave signal intensity is the highest from among the peripheral relay nodes and transmit the request to send data to the selected relay node (dynamic allocation of the destination).

The static allocation of the destination is effective in the case of fixed allocation of a fair number of terminals to each relay node beforehand in order to avoid the data transmitted by many terminals from concentrating in a part of the relay nodes.

In addition, the dynamic allocation of the destination allows change of destination according to the surroundings, and is therefore effective for use in the situation where the terminal or the relay node moves or where the radio wave propagation characteristics between the terminal and the relay node vary.

The routing processing unit 406 of the relay node establishes ad-hoc routing from the relay node to the gateway (S502).

Upon completion of the establishment of the routing to the gateway, the relay node control unit 407 of the relay node responds to the request to send data issued by the terminal (S503).

The routing processing unit 406 of the relay node notifies, to the routing processing unit 402 of the gateway, routing information collected at the time of establishment of the routing to the gateway. The routing information includes information regarding transmission quality such as the transmission error rate at the link and the congestion level at the relay node, in addition to conventional routing protocol information and routing table information (S504).

The routing processing unit 406 of the relay node identifies the number of the terminals directly transmitting the data to the relay node, and notifies the identified number of the terminals to the routing processing unit 402 of the gateway (S505). The number of the terminals as described above can be identified by differentiating information for identifying the source (for example, a MAC address of the source included in a MAC header), which is included in the header information of the data received by the relay node.

The routing processing unit 402 of the gateway records the number of the terminals notified by the routing processing unit 406 of each relay node, as the number of the terminals to be connected to each relay node (S506).

Figure 5:
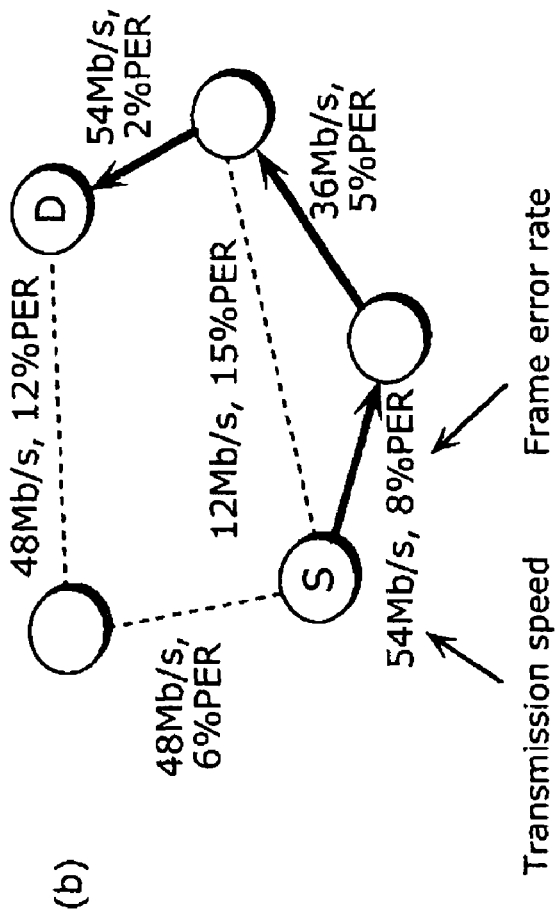
FIG. 5(a) is a diagram showing an example of a characteristic value in a wireless network.
FIG. 5(b) is a diagram for describing a general concept of route selection.

The bottleneck estimating unit 411 obtains the transmission error rate or the congestion level from the routing information notified from the routing processing unit 406 of each relay node to the routing processing unit 402 of the gateway (S507). The transmission error rate and the congestion level included in the routing information shall be described later in detail with reference to FIG. 5.

Figure 7:
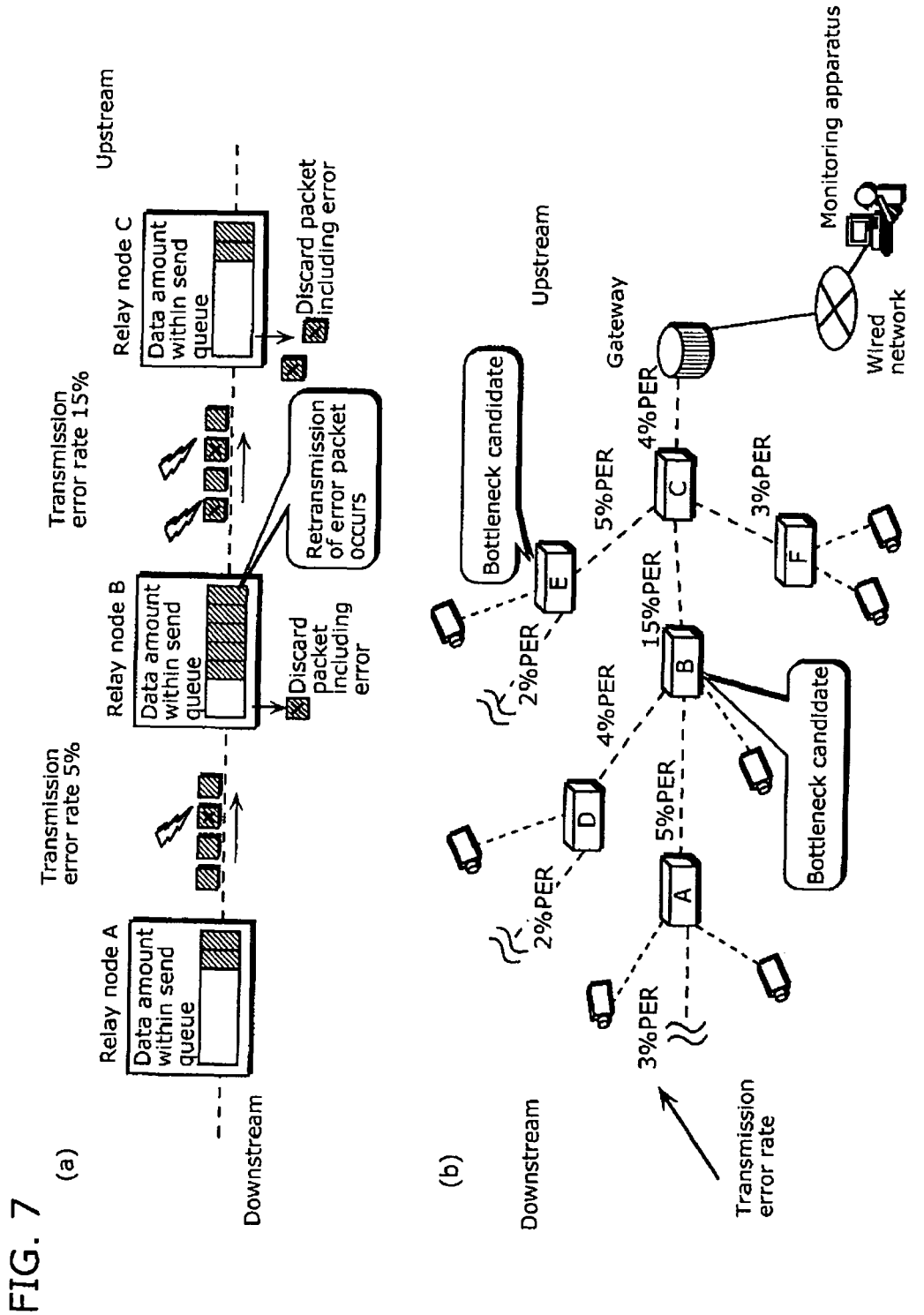
FIG. 7(a) is a diagram for describing an example of a situation in which a bottleneck is generated.
FIG. 7(b) is a diagram showing an example of a network situation represented by a transmission error rate recorded in the transmission error rate table.
Figure 8:
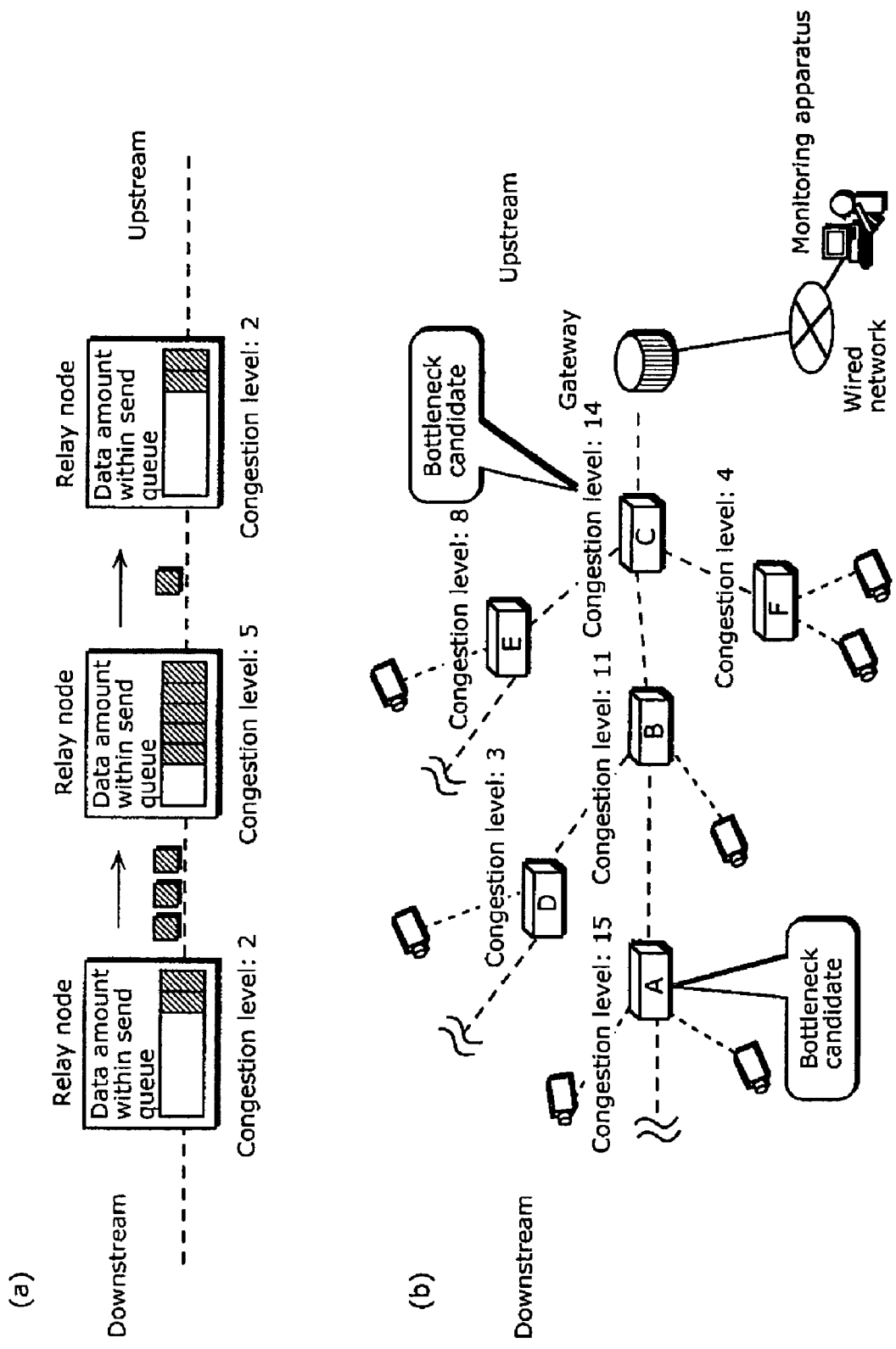
FIG. 8(a) is a diagram for describing another example of a situation in which a bottleneck is generated.
FIG. 8(b) is an example of a network situation represented by congestion level recorded in the congestion level table.

The bottleneck estimating unit 411 estimates relay node M as the bottleneck in the entire network, based on the distribution of the obtained transmission error rate at each link or congestion level at each relay node in the wireless ad-hoc network (S508). A specific method for estimating the relay node M to be the bottleneck shall be described later in detail with reference to FIGS. 7 and 8.

The band estimating unit 401 of the gateway issues, to the band estimating unit 405 of the relay node M estimated as the bottleneck by the bottleneck estimating unit 411, a request to send band-measuring data for measuring the effective band. The band estimating unit 405 of the relay node M, having received the request, transmits the band-measuring data to the band estimating unit 401 of the gateway.

The band estimating unit 401 of the gateway obtains the effective band for a route from the relay node M to the gateway, based on the amount of the band-measuring data transmitted from the band estimating unit 405 of the relay node M and the time required for the reception (S509).

The band allocation determining unit 403 calculates a data transmission amount for each terminal (that is, the transmission band that should be used by each terminal for data transmission), based on the effective band for the route from the relay node M to the gateway and the number of the terminals transmitting the data to the gateway via the relay node M (S510).

The band allocation determining unit 403 notifies the calculated data transmission amount to each terminal (S511).

The transmission rate control unit 408 of each terminal adjusts the transmission band that the terminal uses for transmitting the data, in accordance with the data transmission amount notified by the band allocation determining unit 403 (S512).

With such operation, the transmission band is allocated to each terminal based on the estimation of the bottleneck in the wireless ad-hoc network.

<Transmission Error Rate and Congestion Level Used for Routing Establishment>

Next, routing information regarding the transmission error rate at each link and the congestion level at each relay node, both of which are used for ad-hoc routing establishment, shall be described in detail.

In the present invention, the routing information used for establishing ad-hoc routing includes not only conventional information exchanged by routing protocol when the routing is established (such as destination IP address, source IP address, sequence number, survival time, and hop count) but also information regarding the transmission quality, for example, the transmission error rate at each link and the congestion level at each relay node.

For example, in IEEE802.11s with which standardization is currently promoted, the following is suggested. (For example, see Shiro SAKATA, "Mobile Ad Hoc Networks and Wireless LAN Mesh Networks", The Institute of Electronics, Information and Communication Engineers Transactions on Communications: B, Vol. J89-B, No. 6, pp. 811-823: Non-patent Reference 1). Basic characteristics affecting the quality of wireless LAN mesh networks are: wireless quality, interference, and availability of wireless resources. Reflecting all these situations, Airtime is suggested for a wireless metric that is easy to implement.

In IEEE802.11s, Airtime metric Ca is defined as below:

$$C_a = \left[O_{ca} + O_p + \frac{B_t}{r}\right]\frac{1}{1 - e_{pt}} \quad \text{[Expression 1]}$$

$O_{ca}$, $O_p$, and $B_t$ in the above expression represent, respectively: overhead required for channel access, protocol overhead, and frame length of a test packet used for measuring the frame error rate. r represents transmission speed, and $e_{pt}$ represents the frame error rate. Where $C_a$, $O_{ca}$, $O_p$, and $B_t$ are known, it is possible to calculate the frame error rate $e_{pt}$ as the transmission error rate.

Such information, when establishing routing between relay nodes (S502 in FIG. 4), is measured through exchanges, between relay nodes, of test packets for measuring the frame error rate at the link.

The frame error rate at the link between the relay nodes is determined, based on the ratio of the amount of is information of the test packets having been transmitted for measuring the amount of information in which an error has occurred. Likewise, it is also possible, through such exchanges of test packets, to measure the frame error rate at the link connecting the sending terminal and the relay node.

FIG. 5(a) is a diagram showing specific numeric examples for parameter $O_{ca}$, $O_p$, and $B_t$, which are applied in IEEE802.11a and IEEE802.11b. Generally, when establishing routing from a source to a destination, it is possible to select a route having a high communication quality by calculating the wireless metric at each link.

FIG. 5(b) is a diagram for describing a concept of such routing establishment. For each link in the wireless ad-hoc network, a transmission speed and a frame error rate are shown as examples of wireless metrics.

This example shows: when establishing routing from source S to destination D, preferentially selected is a link having a higher effective speed, which is obtained by deducting, from the transmission speed, an ineffective speed corresponding to the frame error rate.

In addition, in IEEE802.11s, as a method for monitoring congestion generated at the relay node, a monitoring method is suggested in which: upper-limit and lower-limit values should be provided to a rate based on the difference between the reception rate and the transmission rate, and to the size of the send queue (IEEE802.11-06/0328r0, February 2006: Non-patent Reference 2).

It is also possible to define a metric using, in place of the transmission error rate, the congestion level indicating the degree of congestion obtained as a result of the monitoring as described above, and use a routing protocol extended for utilizing this metric in routing establishment (for example, a protocol for performing routing which avoids a congested node). In this case, it is possible to obtain the congestion level from the routing information.

Thus, the routing information regarding the transmission error rate (frame error rate) at each link or the congestion level at each relay node, which has been used by the routing processing unit 406 of each relay node for establishing the routing to the gateway, is notified to the routing processing unit 402 of the gateway.

Then, the transmission error rate and the congestion level are obtained from the routing information by the bottleneck estimating unit 411 of the gateway, to be recorded in a transmission error rate table or a congestion level table provided in the gateway.

FIG. 6(a) is a diagram showing an example of the transmission error rate table for recording the transmission error rate at each link. As FIG. 6(a) shows, in the transmission error rate table, an identification number for differentiating each link and the transmission error rate at the link are recorded in association with each other.

When the routing information includes the transmission error rate at a new link that is not recorded in the transmission error rate table, the routing processing unit 402 of the gateway adds a new link identification number to the transmission error rate table, so that the transmission error rate at the new link is recorded. In addition, when the routing information includes a new transmission error rate at a link that is already registered, the transmission error rate at the corresponding link is updated with the new transmission error rate.

FIG. 6(b) is a diagram showing an example of the congestion level table for recording the congestion level at each relay node. As FIG. 6(b) shows, an identification number for differentiating each relay node and the congestion level at the relay node are recorded in association with each other.

When the routing information includes the congestion level at a new relay node that is not recorded in the congestion level table, the routing processing unit 402 of the gateway adds a new node identification number to the congestion level table, so that the congestion level at the new relay node is recorded. In addition, when the routing information includes a new congestion level at a relay node that is already registered, the congestion level at the corresponding relay node is updated with the new congestion level.

<Estimating the Bottleneck Node Based on the Transmission Error Rate>

Next, a method of estimating a relay node to be the bottleneck based on the distribution of the transmission error rate at each link on the wireless ad-hoc network shall be described.

FIG. 7(a) is a diagram for describing a situation where a bottleneck is generated due to difference in the transmission error rate between a link on the receiving side and a link on the sending side of a relay node.

FIG. 7(a) shows the case where the transmission error rate is different among three relay nodes (relay node A, relay node B, and relay node C) provided on the transmission path in the wireless ad-hoc network: the transmission error rate at a link between relay node A and relay node B is different from the transmission error rate at a link between relay node B and relay node C.

Generally, according to the IEEE802.11 standard applied to a wireless LAN and so on, when a packet contains an unrestorable transmission error due to noise from the outside or the like on the transmission path, the packet is not properly delivered to the receiving side, causing the relay node on the sending side to retransmit the packet which has not been properly delivered.

On the other hand, the relay node on the receiving side, which has received the packet containing an unrestorable transmission error, discards the packet containing the transmission error.

Therefore, at relay node B with which the transmission error rate at the link on the sending side (between relay nodes B and C) is higher than the transmission error rate at the link on the receiving side (between relay nodes A and B), the frequency of packet retransmission from the relay node B increases, resulting in an increase in average retention time for each packet within a send queue; however, of the packets transmitted to the relay node B, the number of the packets discarded for the reason of containing the transmission error does not increase.

Therefore, the residual number of packets retained at the relay node B is likely to increase, resulting in a high possibility that the relay node B will become a bottleneck point causing congestion on the transmission path.

Conversely, at the relay node B, when the transmission error rate at the link on the sending side (between the relay nodes B and C) is lower than the transmission error rate at the link on the receiving side (between the relay nodes A and B), an increase in the number of packets discarded for the reason of containing the transmission error, among the packets transmitted to the relay node B, surpasses an increase in the retention time for each packet remaining in the send queue due to the retransmission of the packets from the relay node B.

Therefore, the residual number of packets retained at the relay node B is not likely to increase, resulting in a low possibility that the relay node B will become the bottleneck point causing congestion on the transmission path.

Based on this concept, the bottleneck estimating unit 411 of the gateway searches for the relay node at which the transmission error rate at the link on the sending side is higher than the transmission error rate at the link on the receiving side by reference to the transmission error rate at each link obtained from the routing information and recorded in the transmission error rate, so as to estimate the relay node as the transmission band bottleneck on the transmission path.

For example, the case is assumed where the transmission error rate at each link, as shown in FIG. 7(b) as an example, is recorded in the transmission error rate table and where the data traffic is flowing from plural sending terminals toward the gateway.

In this case, the transmission error rate at each link located upstream and downstream of each relay node is: 5% PER at an upstream link and 3% PER at a downstream link of relay node A; 15% PER at an upstream link B, and 5% PER and 4% PER at downstream links of relay node B; 4% PER at an upstream link and 5% PER, 15% PER and 3% PER at downstream links of relay node C; 4% PER at an upstream link and 2% PER at a downstream link of the relay node D; and 5% PER at an upstream link and 2% PER at a downstream link of relay node E; and relay node F has only an upstream link at which the transmission error rate is 3% PER.

The bottleneck estimating unit 411 compares the transmission error rates at the upstream and downstream links of each relay node with reference to the transmission error rates recorded in the transmission error rate table, and thereby identifies the relay nodes B and E as relay nodes at which the transmission error rate at the upstream link is higher than the transmission error rate at the downstream link, to estimate these relay nodes to be the bottlenecks in the transmission band on the transmission path.

Note that the bottleneck estimating unit 411 compares the transmission errors by differentiating the link on the receiving side from the link on the sending side at each relay node; therefore, even by reference to the same transmission error rate table, the relay node C is estimated as the candidate relay node for the bottleneck when the traffic is transmitted from the gateway toward the sending terminal.

The above-described collection of transmission error rates at data links on the path by use of routing can be performed prior to the transmission of the traffic, and has therefore a feature that allows performance of bottleneck estimation using the transmission error rate before the traffic is transmitted from the sending terminals.

<Estimating the Bottleneck Node Based on the Congestion Level>

Next, a method of estimating a relay node to be the bottleneck based on the distribution of the congestion level at each relay node on the wireless ad-hoc network shall be described.

FIG. 8(a) is a diagram showing a relationship between a residual amount of transmission data that each relay node in the wireless ad-hoc network holds within the send queue and the congestion level. This example shows the case where: the congestion level at a relay node located in the middle is 5; the congestion level at an upstream relay node is 2; and the congestion level at a downstream relay node is 2.

At the relay node, when the amount of the received data is larger than the amount of the transmitted data, the amount of the data retained within the send queue increases, raising the congestion level at the relay node.

Since the relay node, at which the congestion level is higher than at any other relay node with which the relay node is directly connected through a link, has a narrower transmission band for the link through which the data is transmitted to the upstream relay node than the transmission band for the link through which the data is received from the downstream relay node, and as a result, it is possible to estimate that the relay node has become the transmission band bottleneck on the transmission path.

Based on this concept, the bottleneck estimating unit 411 of the gateway estimates, as the bottleneck on the transmission path, the relay node at which the congestion level is higher than at any other relay node with which the relay node is directly connected through the link, with reference to the congestion level at each relay node obtained from the routing information and recorded on the congestion level table.

For example, the case is assumed where the congestion level at each relay node, as shown in FIG. 8(b), is recorded in the congestion level table.

In this case, the congestion level at each relay node is: 15 at relay node A: 11 at relay node B: 14 at relay node C; 3 at relay node D; 8 at relay node E; and 4 at relay node F.

The bottleneck estimating unit 411 identifies the relay nodes A and C as relay nodes at which the congestion level is higher than at any other relay node with which the relay nodes A and C are directly connected through links, by comparing, by reference to the congestion levels recorded in the congestion level table, the congestion level at each of these relay nodes and the congestion levels at the other relay nodes with which the relay nodes A and C are directly connected through the links, to estimate the relay nodes A and C as candidates for the bottleneck relay nodes in the transmission band on the transmission path.

<Other Information Used for Estimating the Bottleneck Node>

Note that it is also possible to use various types of information, other than such a transmission error rate at a data link as described above and transmission buffer usage as indices for measuring the transmission error rate and the congestion level used for estimating the transmission band bottleneck on the transmission path.

For example, instead of using the transmission buffer usage, a frequency of retransmission of transmission data, which is performed by each relay node when the data transmission fails, may be measured, and then the measured average frequency of retransmission of transmission data may be collected so as to be used as an index for measuring the congestion level at each relay node for estimating the bottleneck.

It is possible to consider that such occurrence of retransmission between relay nodes is caused by congestion or a transmission error occurring at a destination relay node to which the data has been transmitted.

Based on this concept, the bottleneck estimating unit 411 checks the frequency of retransmission at each relay node, identifies a relay node at which the frequency of retransmission is higher than at any other relay node with which the identified relay node is directly connected through a link, and estimates a relay node located upstream of the identified relay node as the bottleneck candidate.

In addition, instead of the transmission error rate at data links, signal and noise levels at data links, and a signal-to-noise ratio (SNR) representing, logarithmically, the amount of noise with respect to a signal may be measured at each relay node and collected as part of the routing information to be used for estimating the bottleneck as an index for measuring the transmission quality at the data links.

A link having a smaller SNR, which represents the noise level with respect to the signal level, has a higher transmission error rate. Therefore, the bottleneck estimating unit 411 identifies the SNR at each link, identifies a relay node at which the SNR at its upstream link is smaller than the SNR at its downstream link, and estimates the relay node to be the bottleneck candidate on the transmission path.

In addition, in the case where a maximum packet size of the transmission data is limited at each relay node by maximum transfer unit (MTU) or the like, the maximum packet size transmissible from each relay node toward the data link may be collected, instead of the data-link transmission error rate, to be used for measuring the transmission quality at the data link so as to estimate the bottleneck.

Since a relay node having a smaller MTU transmits the data by dividing the data into small packets, it is possible to consider that the throughput is likely to decrease.

Based on this concept, the bottleneck estimating unit 411 checks the value of MTU at each relay node, identifies a relay node having a smaller MTU than any other relay node with which the relay node is directly connected through a link, and estimates the relay node as the bottleneck candidate on the transmission path.

In addition, in the case where the frequency of retransmission is high, the larger the value of MTU is, the larger the retransmitted packet grows; therefore, the retransmission takes a longer time than in the case where the value of MTU is smaller, thus causing a decrease in the throughput. For this reason, when it is possible to obtain the frequency of retransmission of the transmission data in addition to the value of MTU, the bottleneck estimating unit 411 may also check the value of MTU and the frequency of retransmission at each relay node, so as to estimate, as the bottleneck candidate on the transmission path, a relay node at which the value of MTU is large and the retransmission is occurring frequently.

Note that for specifying the frequency of retransmission of transmission data, the signal level, the noise level, and the maximum packet length at each relay node, it is possible to obtain these with a command such as "iwconfig" in the case of using a UNIX™-like operating system or a system using Linux.

In addition, such obtainment of information as described above is performed by the gateway control unit 404 or the terminal control unit 410 when the gateway control unit 404 or the terminal control unit 410 detects that the content of the routing table has been changed as a result of routing reestablishment performed by the routing processing unit 402 or the routing processing unit 406 in step S502 described in FIG. 4 or in FIG. 21 that is to be described later.

<Automatic Allocation of a Fair Transmission Band>

Figure 9:
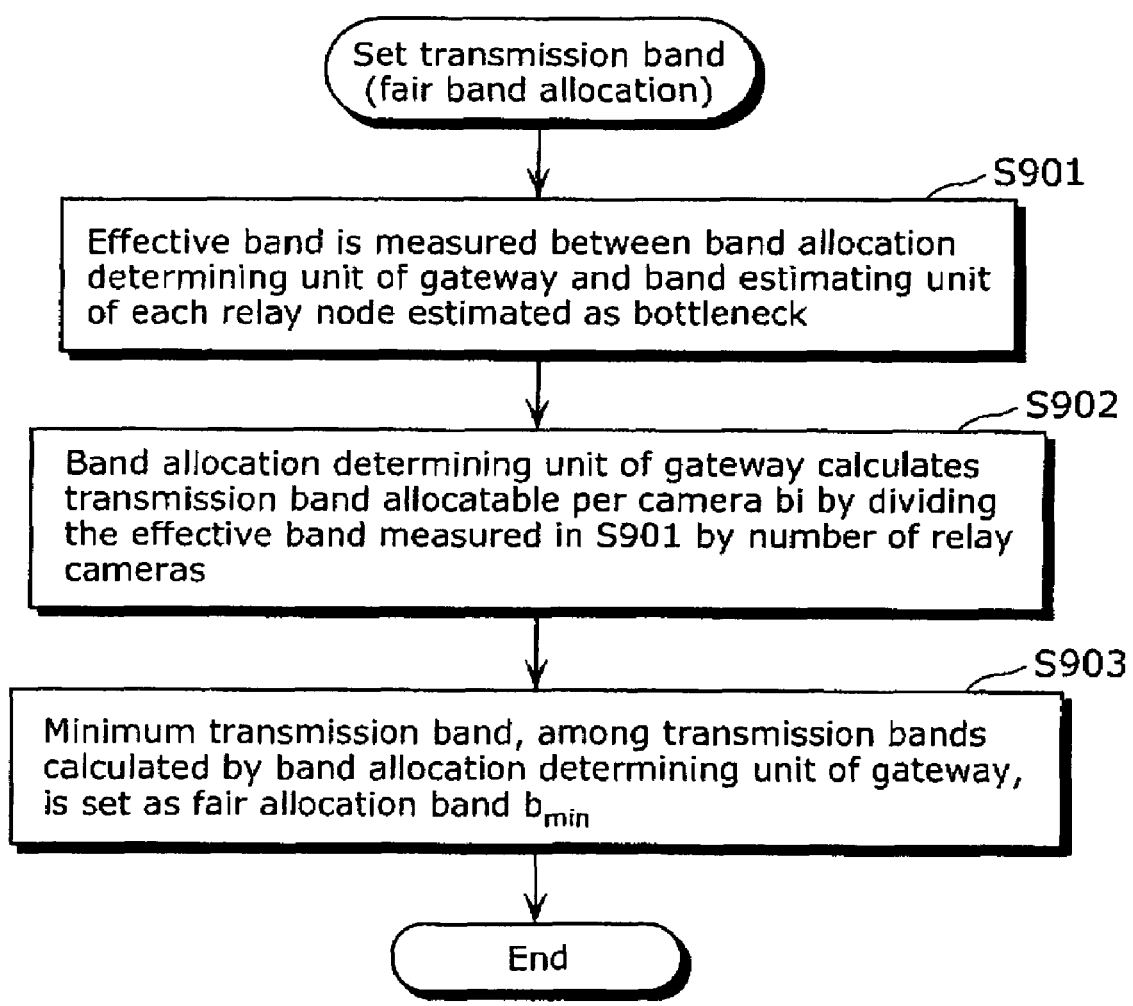
FIG. 9 is a flowchart showing an example of processing for automatic allocation of a fair transmission band to terminals and relay nodes.

FIG. 9 is a flowchart showing an example of processing for automatic allocation of a fair transmission band to terminals and relay nodes.

First, fairness as described in the present invention shall be defined. Fairness is defined as the same transmission rate for the transmissible data that is relayed via the gateway through a relay node from each sending terminal.

The effective band is measured between the band estimating unit 401 of the gateway and the band estimating unit 405 of the relay node estimated as the bottleneck. When plural relay nodes are estimated as bottlenecks, the effective band for the route to the gateway is measured with respect to each of the estimated relay nodes (S901).

Note that specifically, in a band estimating method for the band estimating unit 401, the effective transmission speed may also be measured at the relay node and returned to the gateway, or the propagation delay time may also be measured between the gateway and the relay node at which the effective transmission speed is to be measured, so as to estimate the band.

Next, the band allocation determining unit 403 of the gateway obtains a transmission band $b_i$ that the relay node can allocate per camera by dividing the effective band measured in step S901 by the number of cameras from which the relay node relays the data (that is, dividing the effective band). When plural relay nodes are estimated as the bottlenecks, a transmission band $b_i$ is obtained by dividing the effective band that is measured with respect to each of the relay nodes (S902).

The transmission band obtained by the band allocation determining unit 403 of the gateway is set as a fair transmission band $b_{min}$. When plural relay nodes are estimated as the bottlenecks, a narrowest transmission band is set as $b_{min}$ from among the obtained transmission bands $b_i$s (S903).

Figure 10:
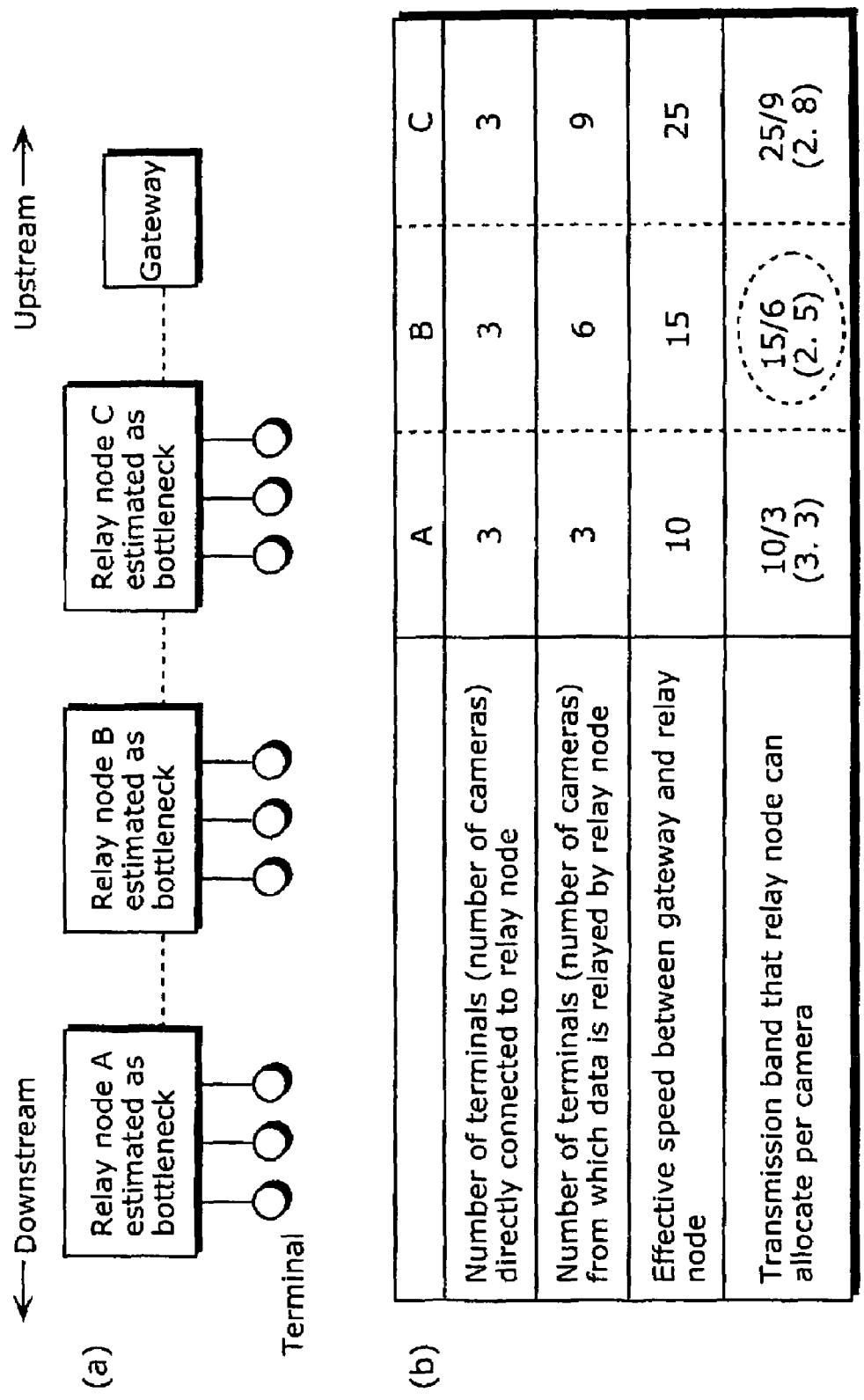
FIGS. 10(a) and (b) is a diagram for describing a specific example of fair allocation of the transmission band to each camera.

FIGS. 10(*a*) and (*b*) is a diagram for describing a specific example of the fair allocation of the transmission band to each camera.

In this example, it is assumed that three relay nodes are estimated as bottlenecks, and these three relay nodes, in an order starting from downstream to upstream, are: relay node A, relay node B, and relay node C. Three sending terminals (cameras) are directly connected to the relay nodes, respectively (FIG. 10(*a*)).

When, according to this example, the maximum transmission band $b_i$ that each of the relay nodes can allocate per camera is obtained based on the network configuration and the effective speed between each of the relay nodes and the gateway, the maximum transmission band $b_j$ is: 3.3 at relay node A; 2.5 at relay node B; and 2.8 at relay node C (FIG. 10(*b*)).

Accordingly, the smallest 2.5 among the obtained transmission bands is set as the transmission band $b_{min}$ that allows a fair allocation to all the cameras.

<Efficient Automatic Allocation of Transmission Bands>

FIG. 11 is a flowchart showing an example of processing for efficient automatic allocation of transmission bands to terminals and relay nodes.

First, "efficient allocation" as described in the present invention shall be defined. Efficient transmission band allocation is defined as allocating, with the least possible idle transmission bands, a transmission band to each terminal from among transmission bands available in the wireless ad-hoc network. Efficient allocation is not necessarily allocating an identical transmission band to every terminal.

The effective band is measured between the band estimating unit 401 of the gateway and the band estimating unit 405 of each of relay nodes estimated as the bottlenecks (S1101).

Next, the band allocation determining unit 403 of the gateway obtains the transmission band $b_i$ that the relay node can allocate per camera by dividing the effective band measured in step S1101 by the number of cameras from which the relay node relays the data (S1102).

Furthermore, the band allocation determining unit 403 of the gateway compares the transmission band $b_i$ of an $i^{th}$ relay node and the transmission band of the i-$1^{th}$ relay node, starting from a relay node closest to the gateway to a relay node farthest from the gateway (from upstream to downstream), so as to adopt the smaller value. However, variable i increases in number, staring from 1, from the closest to the gateway to the farthest from the gateway.

FIG. 12 is a diagram showing an example of a program code for executing step S1103.

It is assumed that $B_1$ is a value obtained by dividing, by the number of all accommodated terminals ($N_{max}$), the effective band between the relay node closest to the gateway among the relay nodes estimated as the bottlenecks and the gateway.

The second relay node from the gateway, among the relay nodes estimated as the bottlenecks, is assumed as i=2. In addition, the effective band for a route between an $i^{th}$ relay node to be evaluated, among the relay nodes estimated as the bottlenecks, and the gateway is measured and divided by the number of terminals accommodated by the relay nodes provided in a route from the relay node at the bottom to the $i^{th}$ relay node to be evaluated among the terminals estimated as the bottlenecks, and the value thus obtained is assumed as $b_i$.

After searching the relay nodes in an order staring from i=2 to the $N_{max}^{th}$ relay node at the bottom that is the farthest from the gateway among the relay nodes estimated as the bottlenecks, $b_i$ is replaced with a smaller value in the search order.

Note that the transmission band $b_i$ for the terminal (camera) connected to a relay node that is not estimated as the bottleneck is replaced with a transmission band $b_i$ for the relay node estimated as a downstream bottleneck closest to the relay node (having a smallest number of hops).

FIGS. 13(*a*) and (*b*) is a diagram for describing a specific example of efficient allocation of the transmission band to each camera.

In this example, it is assumed that three relay nodes are estimated as bottlenecks, and these three relay nodes, in an order starting from downstream to upstream, are: relay node A, relay node B, and relay node C. Three sending terminals (cameras) are directly connected to the relay nodes, respectively (FIG. 13(*a*)).

When, according to this example, the maximum transmission band $b_i$ that each of the relay nodes can allocate per camera is obtained based on the network configuration and the effective speed between each of the relay nodes and the gateway, the maximum transmission band $b_i$ is: 3.3 at relay node A; 2.5 at relay node B; and 2.8 at relay node C (FIG. 13(*b*)).

Through the processing described with reference to FIGS. 11 and 12, the transmission band to be allocated to a camera from which the data is relayed by the relay node C is calculated to be 2.8, and the transmission band to be allocated to a camera from which the data is relayed by the relay node B or the relay node A is calculated to be 2.5.

<Narrowing Down Bottleneck Candidates According to Variations in Transmission Speed at Relay Nodes>

In a wireless LAN in accordance with the IEEE802.11 standard, it is possible to perform communication by selecting a transmission speed that varies according to differences in the method of modulating and demodulating the transmission data or differences in the coding ratio of a transmission error correction code, and multirate control is performed in which an apparatus on the sending side performs transmission by varying the transmission speed for the data portion of the transmitted packet with respect to each independent packet.

For example, in IEEE802.11a, 6 Mbps, 12 Mbps, and 24 Mbs are provided as requisite transmission speeds, and 9 Mbps, 18 Mbps, 36 Mbps, 48 Mbps, and 54 Mbps are provided as optional. The sending apparatus automatically selects the transmission speed when the apparatus is set to AUTO mode.

In addition, the sending apparatus automatically selects the transmission speed by multirate control, by observing frame errors and so on, and suppresses increase in the transmission error rate by switching to a lower transmission speed in a poor propagation environment (Masahiro MORIKURA and Shuji KUBOTA, "802.11 High-speed Wireless LAN Textbook", Impress: Non-patent Reference 3).

FIGS. 14(*a*) and (*b*) is a diagram describing degradation of propagation characteristics and decrease in transmission speed occurring on the transmission path due to a routing change.

FIGS. 14(*a*) and (*b*) shows a value of transmission speed at each link between the respective three relay nodes on the transmission path.

There is a high possibility that a relay node, at which a transmission speed for the transmitted packet has decreased due to the routing change as shown in FIG. 14(*b*) as compared to the status before the routing change as shown in FIG. 14(*a*), has become the transmission band bottleneck on the transmission path due to an increase in the transmission error rate caused by increased degradation of the propagation environment as a result of the routing change.

Therefore, by further selecting a relay node at which the transmission speed has decreased after the routing change from among the relay nodes estimated by the bottleneck estimating unit 411 as the bottleneck candidates in the transmission band on the transmission path, it is possible to narrow down the relay nodes estimated as the bottlenecks (that is, to narrow down the target with which the execution band for the route from the gateway is to be measured).

With this, it becomes possible to reduce communication for measuring an effective speed from the relay node to the gateway and to determine the transmission band for each sending terminal more expeditiously.

Figure 15:
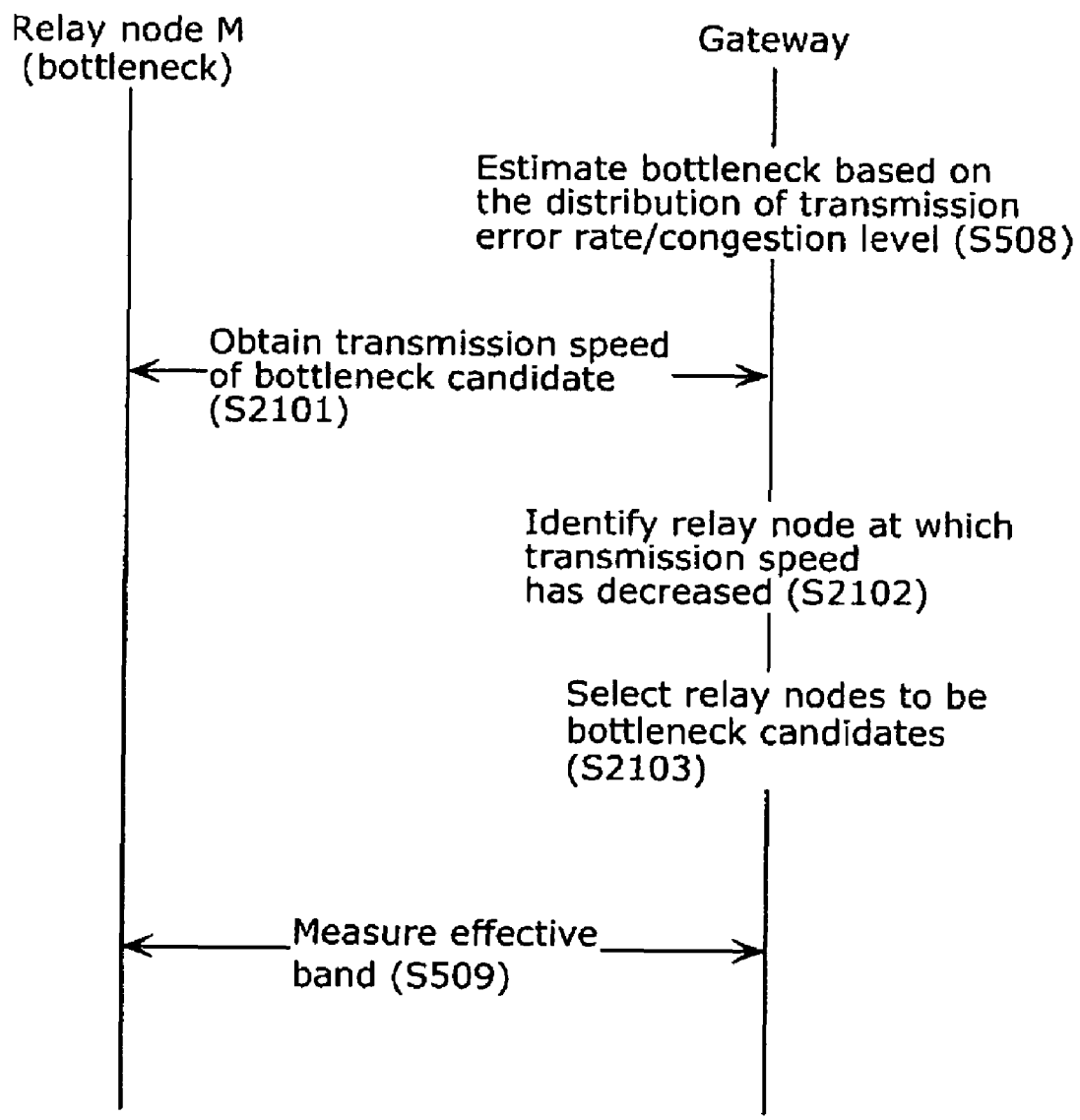
FIG. 15 is a sequence chart showing an example of an operation for narrowing down to relay nodes that are to be bottleneck candidates, based on variations in transmission speed at the relay nodes.

FIG. 15 is a sequence chart showing an example of an operation for narrowing down the candidate relay nodes for the bottlenecks according to variations in transmission speed at the relay nodes.

Of the operations cooperatively performed by the terminal, the relay nodes, and the gateway shown by the sequence chart in FIG. 4, the processing for narrowing down the candidate relay nodes for the bottlenecks according to variations in transmission speed at the relay nodes is performed after the processing in step S508 for estimating the bottleneck based on the distribution of transmission errors, and before the processing in step S509 for measuring the effective band for a route from the gateway to the relay node M that is estimated as the bottleneck candidate.

The gateway control unit 404 checks with the relay node control unit 407 of the relay node M that is estimated as the bottleneck candidate for the value of a transmission speed at which the data is to be transmitted to a relay node located upstream (S2101).

The gateway control unit 404 records the obtained variations in transmission speed for each of the relay nodes as transmission speed information. For relay nodes with which the transmission speed has already been measured, the transmission speed currently measured and the transmission speed previously measured are compared, so as to identify a relay node at which the transmission speed has decreased from the previous measurement (S2102).

Next, the gateway control unit 404 of the gateway narrows down to the relay nodes at which the transmission speed has decreased from among the relay nodes estimated as the bottleneck candidates in the transmission band in step S508, as the relay nodes at which the effective speed for the route to the gateway is to be actually measured (S2103).

FIG. 16 is a diagram showing an example of the transmission speed table for recording the measured value of the transmission speed at each link. The transmission speed table is provided in the gateway. As FIG. 16 shows, recorded in the transmission speed table are: an identification number for differentiating each link, transmission speed measured at the link, and measurement time at which the transmission speed is measured.

The gateway control unit 404 of the gateway, in the case of having obtained the transmission speed of a link with which the transmission speed has never been measured before, registers the link number thereof in the transmission speed information and records the transmission speed and a time at which the transmission speed is measured at the link. In addition, when the latest transmission speed is measured for a link with which the transmission speed is already registered, the values for the transmission speed and the measurement time for the corresponding link are updated.

Figure 17:
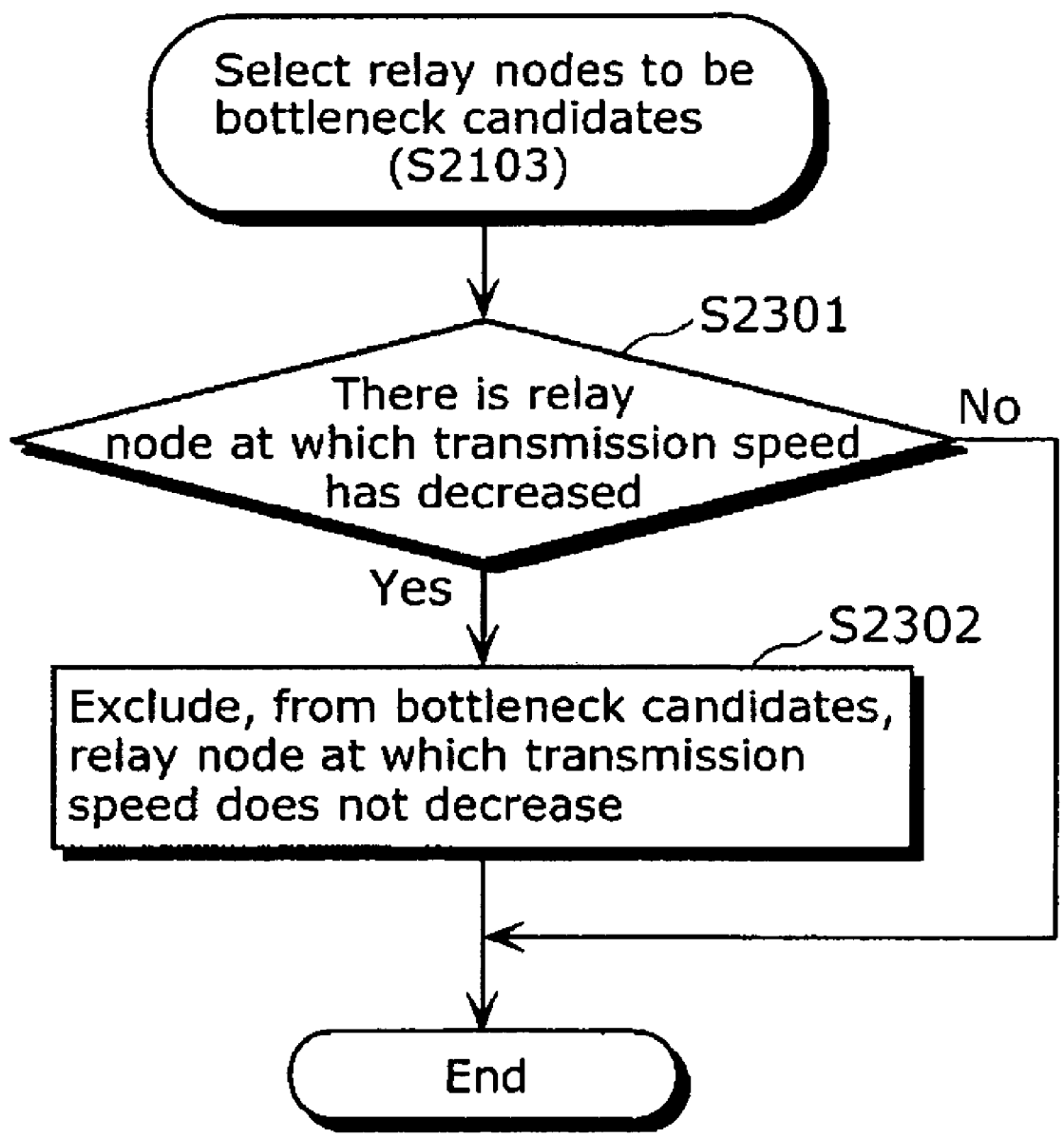
FIG. 17 is a flowchart showing an example of processing for narrowing down the relay nodes estimated as the bottleneck candidates.

FIG. 17 is a flowchart showing an example of the operation for narrowing down the candidate relay nodes for the bottlenecks in the transmission band on the transmission path to a relay node with which the effective transmission speed up to the gateway is to be actually measured.

The gateway control unit 404 judges whether or not, among the bottleneck candidates in the transmission band on the transmission path, there is a relay node at which the transmission speed has decreased due to the routing change. When there is a relay node at which the transmission speed has decreased, the processing moves on to step S2302, and when there is no relay node at which the transmission speed has decreased, the bottleneck candidates are not changed (S2301).

When there is a relay node at which the transmission speed has decreased due to the routing change, the gateway control unit 404 excludes the relay node at which the transmission speed has not decreased from the bottleneck candidates.

With the processing described above, the gateway control unit 404 can narrow down to the relay node with which the effective speed for the route to the gateway is to be measured by selecting the relay node having a higher possibility of becoming the transmission band bottleneck on the transmission path.

This allows reduction of the communication traffic generated for measuring the effective speed between the gateway and the relay node, thus making it possible to determine the transmission band for each sending terminal more expeditiously.

<Processing for Updating Transmission Band Settings>

Next, the processing for updating transmission band settings shall be described.

Figure 18:
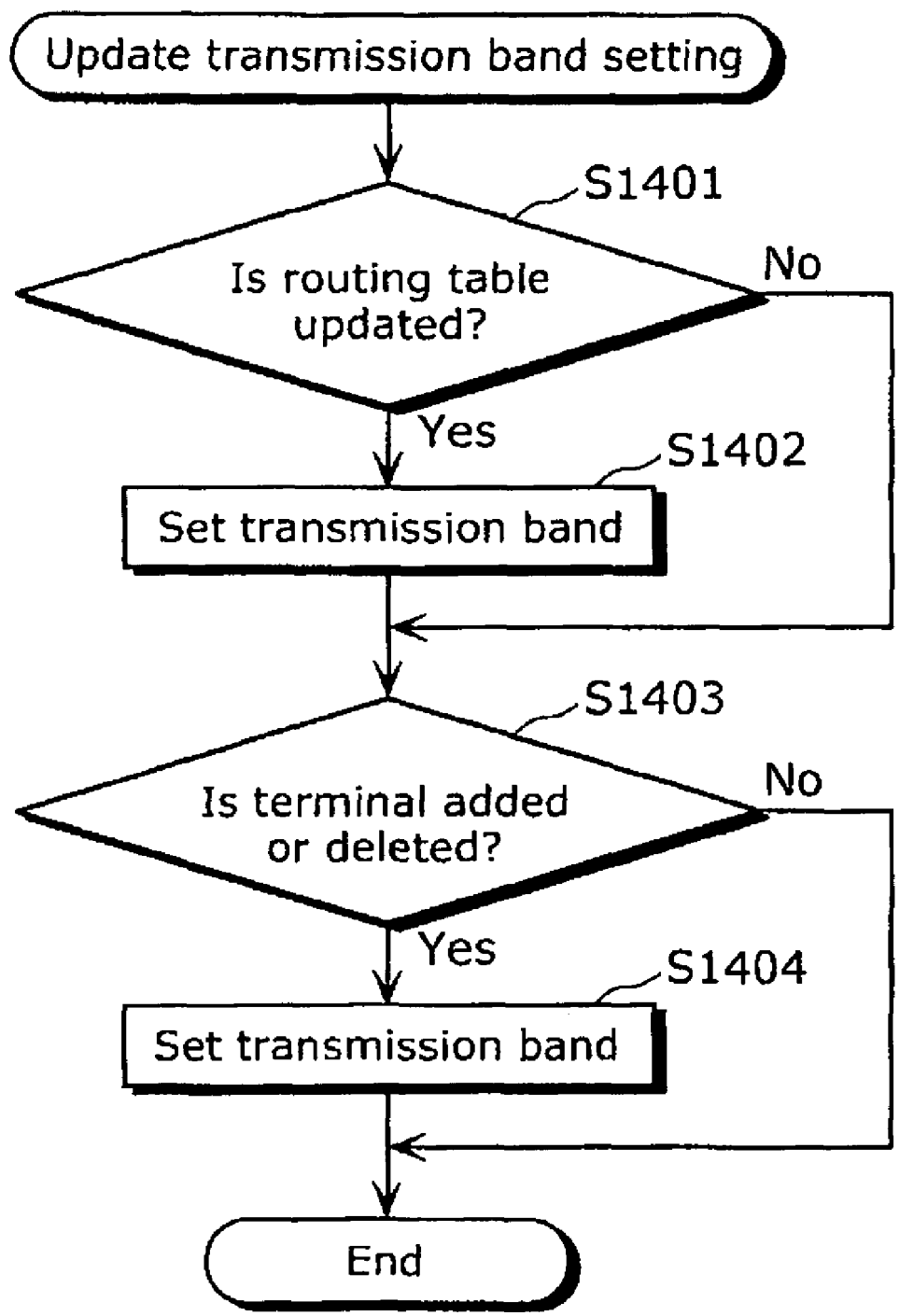
FIG. 18 is a flowchart showing an example of processing for updating the setting of the transmission band.

FIG. 18 is a flowchart showing an example of processing for updating transmission band settings.

The timing for updating transmission band settings can be considered as when the routing table is updated or when addition or deletion of a terminal occurs.

For the case where the routing table is updated, it is possible to assume the case where, for example, the connection status between relay nodes (for example, reception field intensity or transmission error rate) is changed due to variation in radio wave propagation characteristics caused by movement of a person, a vehicle, or the like.

In addition, as a specific example for the addition or deletion of the terminal, installation of a new camera or camera breakdown can be assumed. Note that here the gateway is assumed to detect the addition or deletion of the terminal to or from the wireless ad-hoc network according to the notification sent from the terminal or a relay node.

In the processing for updating the transmission band settings shown in FIG. 18, when the routing table is updated (S1401), the transmission rate for each camera is set in accordance with the transmission band setting algorithm shown in FIG. 9 or FIG. 11 (S1402). In addition, when a terminal is added or deleted (S1403), the transmission rate for each camera is set according to the transmission band setting algorithm shown in FIG. 9 or FIG. 11 (S1404). Note that the gateway control unit 404 controls the updating of the transmission band settings.

Figure 19:
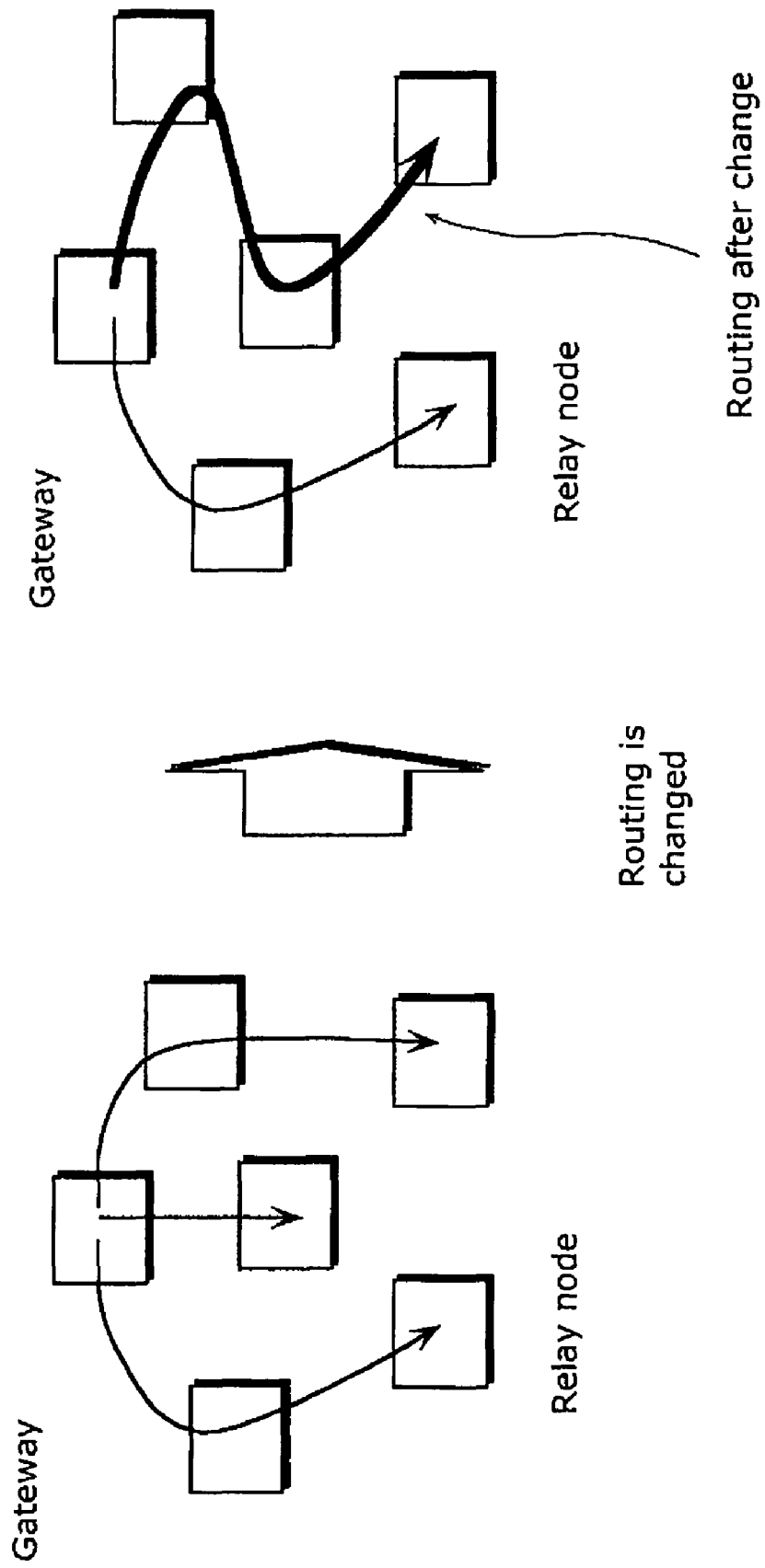
FIG. 19 is a diagram for describing a method for setting the communication band based on changes in routing.

FIG. 19 is a diagram for describing the method for setting the transmission band according to changes in routing.

For achieving high-speed setting of the transmission band, only a changed point in the routing table is extracted, and only the relay node to be updated is targeted for bottleneck estimation. With this, since bottleneck estimation is not performed on the relay node with which the routing is not changed, it becomes possible to speed up the setting of the transmission band.

Specifically, as shown in FIG. 19, the routing processing unit 402 of the gateway extracts a relay node with which the routing is to be updated, and extracts a relay node with which bottleneck estimation is newly required, so as to estimate the bottleneck through the bottleneck estimating unit 411. Note that the gateway control unit 404 controls a series of these respective units.

Second Embodiment

Figure 20:
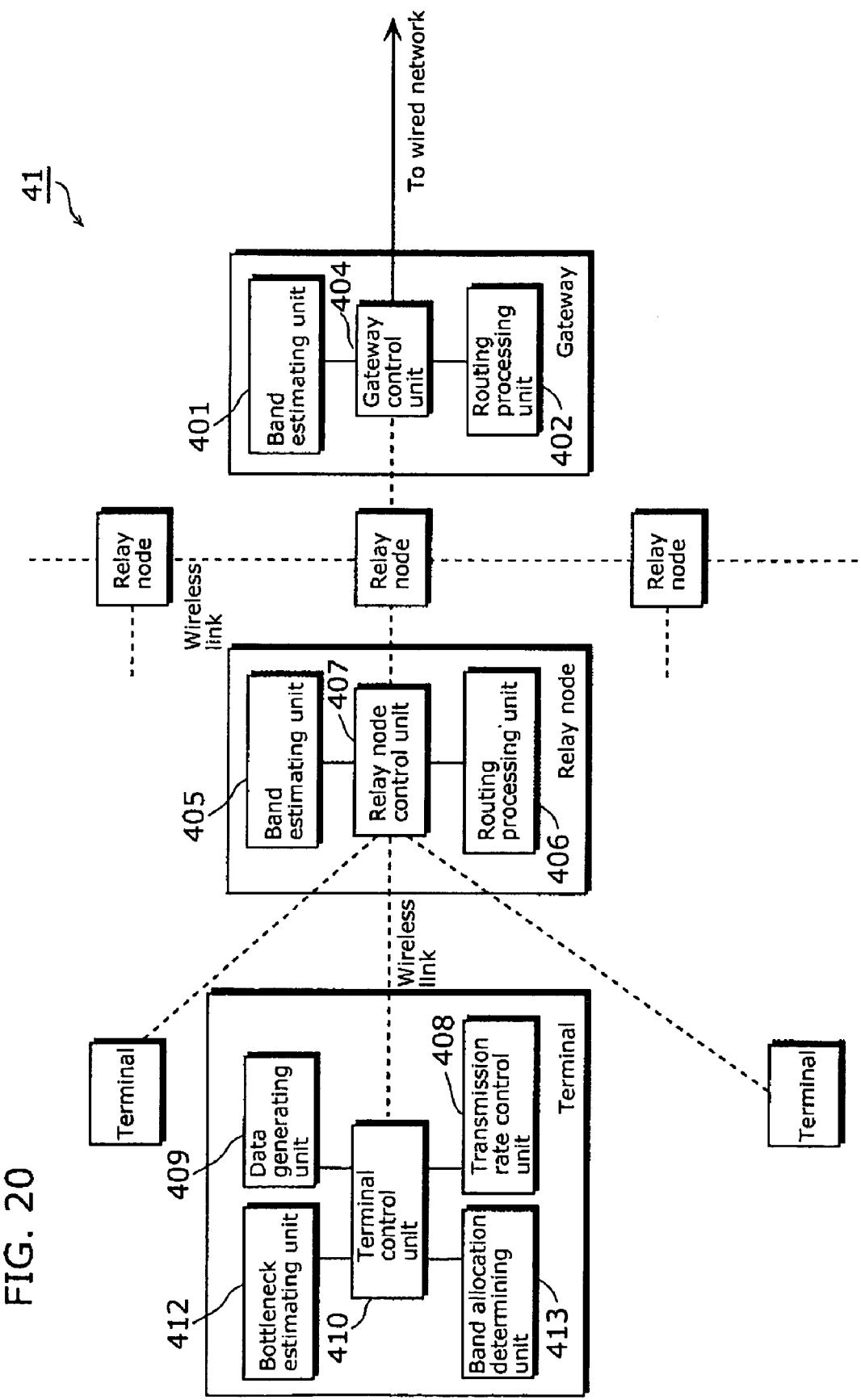
FIG. 20 is a functional block diagram showing an example of a configuration of a network control apparatus in a second embodiment.

FIG. 20 is a functional block diagram showing an example of a configuration of a network control apparatus 41 in a second embodiment of the present invention.

The network control apparatus 41 of the second embodiment is different from the network control apparatus 40 of the first embodiment shown in FIG. 3 in that: a terminal performs the estimation of a relay node to be the bottleneck on the transmission path, which is performed by the bottleneck estimating unit 411 of the gateway in the first embodiment. Hereinafter, the same configuration as in FIG. 3 is assigned with the same numeral and the description thereof shall be omitted, and a different configuration shall be described in detail.

The terminal of the second embodiment includes: a bottleneck estimating unit 412 and a band allocation determining unit 413 in addition to the transmission rate control unit 408, the data generating unit 409, and the terminal control unit 410.

The bottleneck estimating unit 412: obtains routing information from the routing processing unit 406 of the relay node; obtains, from the routing information, information regarding the transmission errors between relay nodes including the gateway or information regarding the congestion at each relay node; and estimates bottlenecks on the transmission path according to the distribution of the information regarding the transmission errors or the information regarding the congestion on the transmission path leading from the terminal to the gateway.

The band allocation determining unit 413 obtains, from the band estimating unit 401 and the routing processing unit 402 of the gateway, the result of the estimation of the transmission band for a route from the relay node to be the bottleneck to the gateway as well as the number of terminals connected to each of the relay nodes, so as to determine, based on such information, the transmission rate for each terminal and the allocation of the transmission band to the relay nodes.

In the network control apparatus 41 thus configured, the bottleneck estimating unit 412 is an example of the bottleneck estimating unit of the present invention, the band estimating unit 401 is an example of the effective band estimating unit of the present invention, and the band allocation determining unit 413 is an example of the band allocation determining unit of the present invention.

Figure 21:
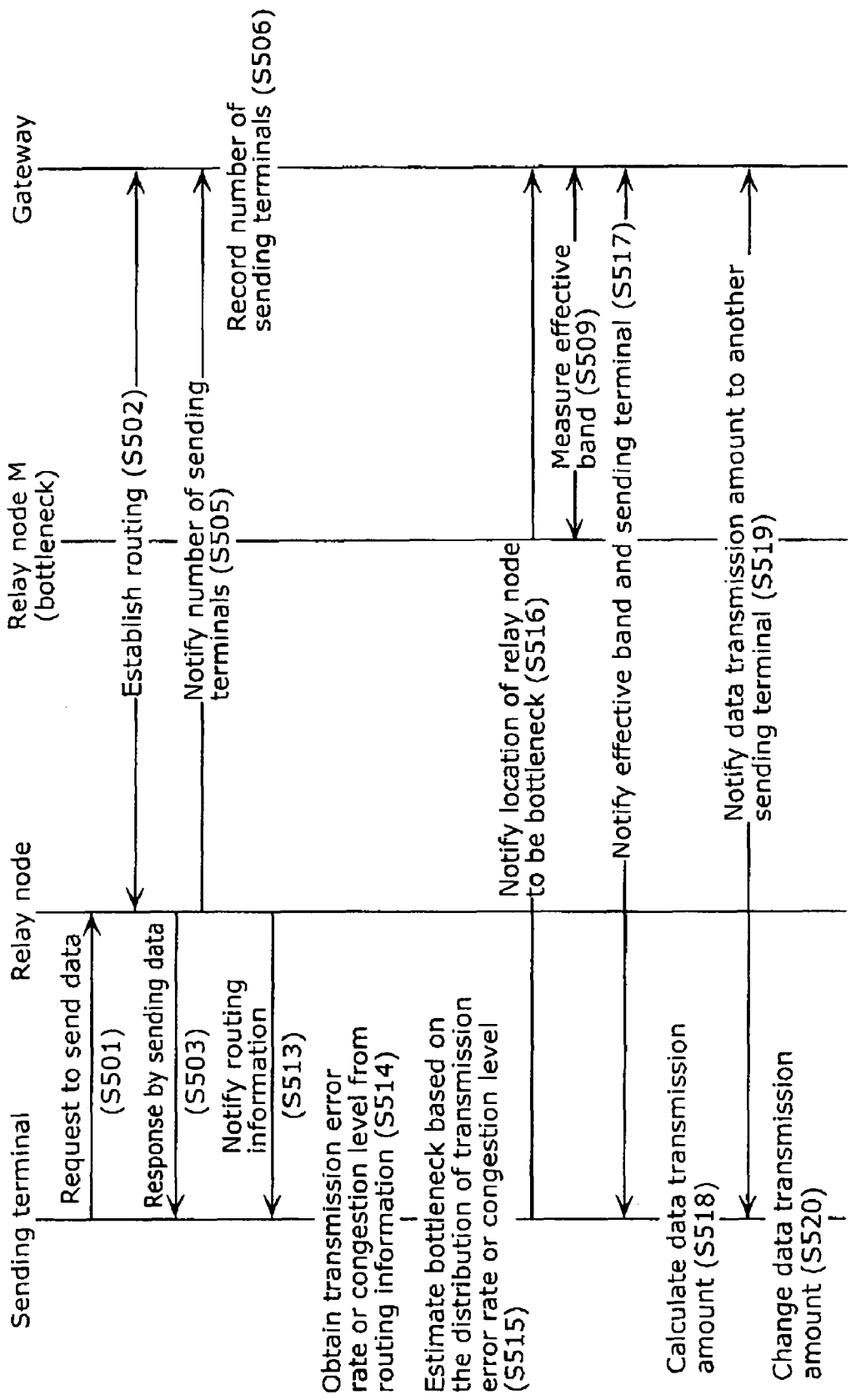
FIG. 21 is a sequence chart showing an example of an operation of the network control apparatus in the second embodiment.

FIG. 21 is a sequence chart showing an example of the operation of the network control apparatus 41. This operation is cooperatively performed by the terminal, the relay nodes, and the gateway as the network control apparatus 41, and includes processing that is characteristic of the network control apparatus 41, that is, the processing for estimating bottlenecks from the distribution of the transmission error or the congestion level in the network.

Note that the same operations as shown in FIG. 4 are assigned with the same numerals, and the description thereof shall be omitted.

In steps from S501 to S503, and steps from S505 to 506, the terminal is connected to the relay node, the routing is established, and the number of terminals is notified and recorded.

The routing processing unit 406 of the relay node transmits to the terminal control unit 410 of the terminal, the routing information collected at the time of establishment of the routing to the gateway. This routing information includes information regarding the transmission quality such as the transmission error rate at links and the congestion level at relay nodes along with conventional routing protocol information and routing table information (S513).

The bottleneck estimating unit 412 of the terminal, as with the bottleneck estimating unit 411 of the gateway, performs the following processing.

From the routing information received from the routing processing unit 406 of the relay node, the transmission error rate between the respective links on the transmission path from the relay node to the gateway or the congestion level at each of the relay nodes (S514) is obtained.

Based on the distribution of the transmission error rate or the congestion level that is obtained, relay node M is estimated to be the bottleneck that is present on the transmission path (S515).

Then, the relay node M estimated as the bottleneck is notified to the band estimating unit 401 of the gateway (S516).

In step S509, as with the operation shown in FIG. 4, the effective band for a route from the relay node M estimated as the bottleneck to the gateway is measured.

The band estimating unit 401 and the routing processing unit 402 of the gateway notifies, to the band allocation determining unit 413 of a sending terminal, the effective band for the route from the relay node M estimated as the bottleneck to the gateway and the number of sending terminals connected to each of the relay nodes (S517).

The band allocation determining unit 413 determines the transmission rate for each terminal and the allocation of the transmission band to each relay node, based on the number of terminals connected to each of the relay nodes and the result of the estimation of the effective band for the route from the relay node that is to be the bottleneck to the gateway (S518).

The band allocation determining unit 413 of the terminal notifies, to another one of the terminals, the newly-obtained transmission rate and allocation of the transmission band to the relay node (S519).

The transmission rate control unit 408 of each terminal adjusts the transmission band that the terminal uses for transmitting the data, according to either the transmission rate calculated by the terminal itself or the transmission rate notified by the band allocation determining unit 413 of another terminal (step S520).

As described above, according to the network control apparatus of the present embodiment, even in an existing network where the gateway does not have a function to estimate the relay node to be the bottleneck and allocate the transmission rate to each terminal, it is possible to cause each terminal to estimate, without changing the gateway, the location of the relay node that is to be the bottleneck through obtainment of necessary information from the gateway, and to allocate the transmission band to each terminal.

<Narrowing Down Bottleneck Candidates According to Variations in Transmission Speed at Relay Nodes>

The network control apparatus 41 of the second embodiment, in the same manner as described earlier, may narrow down the relay nodes to be bottleneck candidates according to variations in transmission speed at each relay node.

Figure 22:
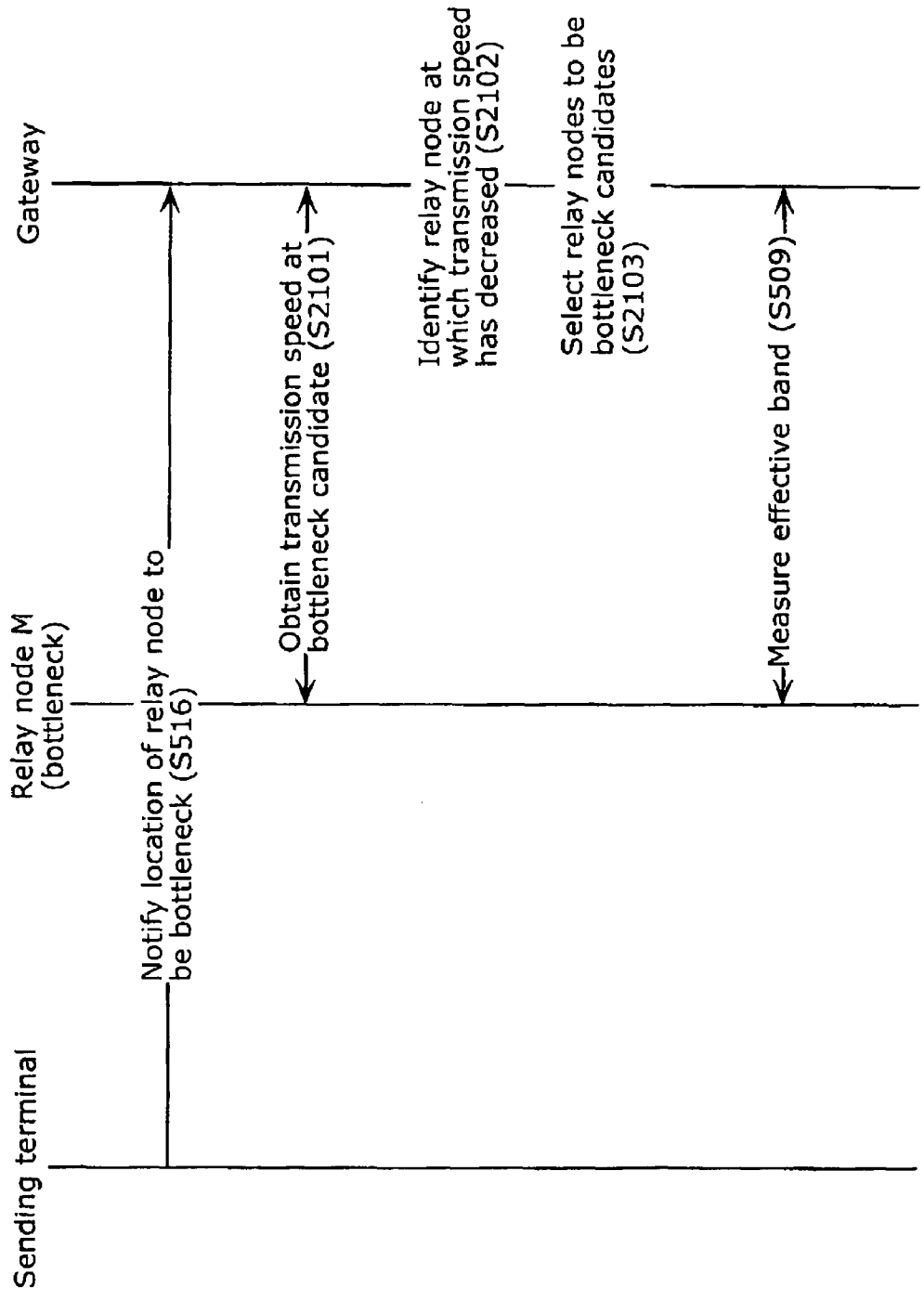
FIG. 22 is a sequence chart showing an example of an operation for narrowing down the relay nodes estimated as bottlenecks.

FIG. 22 is a sequence chart showing an example of the operation for narrowing down the candidate relay nodes for the bottleneck according to variations in transmission speed at each relay node.

The network control apparatus 41 narrows down the bottleneck candidates by selecting a bottleneck candidate according to variations in transmission speed from among the bottleneck candidates estimated by the bottleneck estimating unit 412 of the terminal.

Of the operations cooperatively performed by the terminal, the relay nodes, and the gateway shown by the sequence chart in FIG. 21, the selection of the bottleneck candidate according to variations in transmission speed in the second embodiment is performed after the processing in step S516 for estimating the bottleneck according to the distribution of transmission errors, and before the processing in step S509 for measuring the effective band for the route from the gateway to the relay node estimated as the bottleneck candidate.

Note that each step in FIG. 22 has the same content as each corresponding step in FIG. 21 and FIG. 15 and is therefore assigned with the same numeral, so that the description thereof is omitted.

<Effects>

Figure 23:
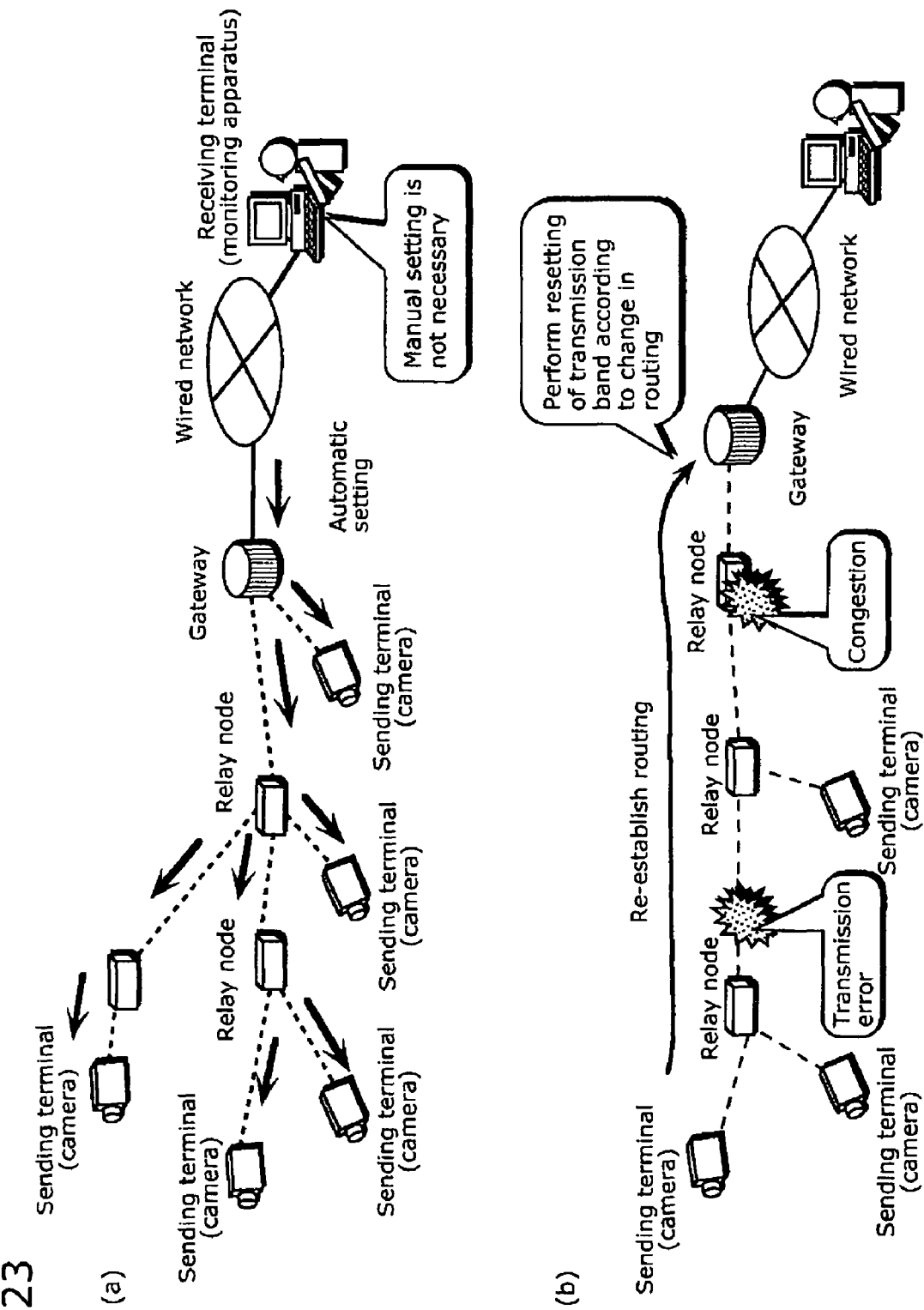
FIGS. 23(a) and (b) is a diagram for describing effects of the present invention.

FIGS. 23(*a*) and (*b*) is a diagram for describing effects of the present invention.

According to the network control apparatus of the present invention, it is possible to automate, in a wireless ad-hoc network, allocation of the transmission band in which fairness among terminals is secured (FIG. 10(*b*)), and efficient allocation of the transmission band for the entire wireless ad-hoc network (FIG. 13(*b*)).

The network control apparatus identifies the bottleneck for the entire network and performs setting of the transmission band (communication speed) for each terminal and relay node; therefore, it is no longer necessary to perform complicated operations such as manual setting of the transmission band that is to be allocated to each terminal as has been conventionally performed in establishing a wireless ad-hoc network.

This effect is more significant when the wireless ad-hoc network is made up of a larger number of terminals.

In addition, as described earlier as the problems to be solved, since the data is transmitted from various sources in the wireless ad-hoc network, there is a case where congestion occurs, or where the band that can be secured varies in position and time according to change of transmission path caused by change in wireless environment.

For example, in general, the larger the number of relay stages from the gateway becomes, the narrower the transmission band that can be secured becomes due to increases in the number of accommodated terminals and wireless influences. In addition, the transmission band that can be secured becomes narrower due to radio wave interferences and so on, as a result of change in the number of sending and receiving terminals, addition or deletion of an obstacle such as a human being or a vehicle, or change in installation position of the relay node.

It is difficult to secure the transmission band by identifying, while taking these various factors into consideration, the transmission band bottleneck for the entire network and previously designing the transmission rate for each terminal and the transmission band for each relay node.

Whereas, according to the network control apparatus of the present invention, by estimating the transmission band bottleneck for the entire network by use of the routing information that is used for establishing the routing from the sending terminal to the gateway, it is possible to perform automatic setting that achieves fairness in quality of service (QoS) in communication for each terminal and efficient allocation of the transmission band each time routing is established as a result of occurrence of packet loss due to a transmission error or occurrence of congestion due to an inflow of the traffic into a relay node on the way (FIG. 23(b)).

Here, the transmission error rate at each link and the congestion level at each relay node, which are kinds of metrics used for routing establishment in the wireless ad-hoc network, can therefore be collected from the entire network as values in which the latest routing is always reflected.

The network control apparatus of the present invention, which estimates the bottleneck based on such a transmission error rate or congestion level, allows bottleneck estimation that excels in both follow-up ability to follow changes in the network and globality.

Furthermore, for determining the transmission band to be allocated to each terminal, the effective band for the route to the gateway is measured only with the relay node estimated as the bottleneck, thereby reducing the communication traffic and throughput required for the measurement, and allowing, as a result, transmission band allocation that excels in responsiveness.

As described in the embodiments, in the case of narrowing down the relay nodes estimated as bottlenecks to a relay node with which the effective band is to be actually measured according to variations in transmission speed, it is possible to further reduce the communication traffic and throughput required for measurement of the effective band.

<Application 1>

Figure 24:
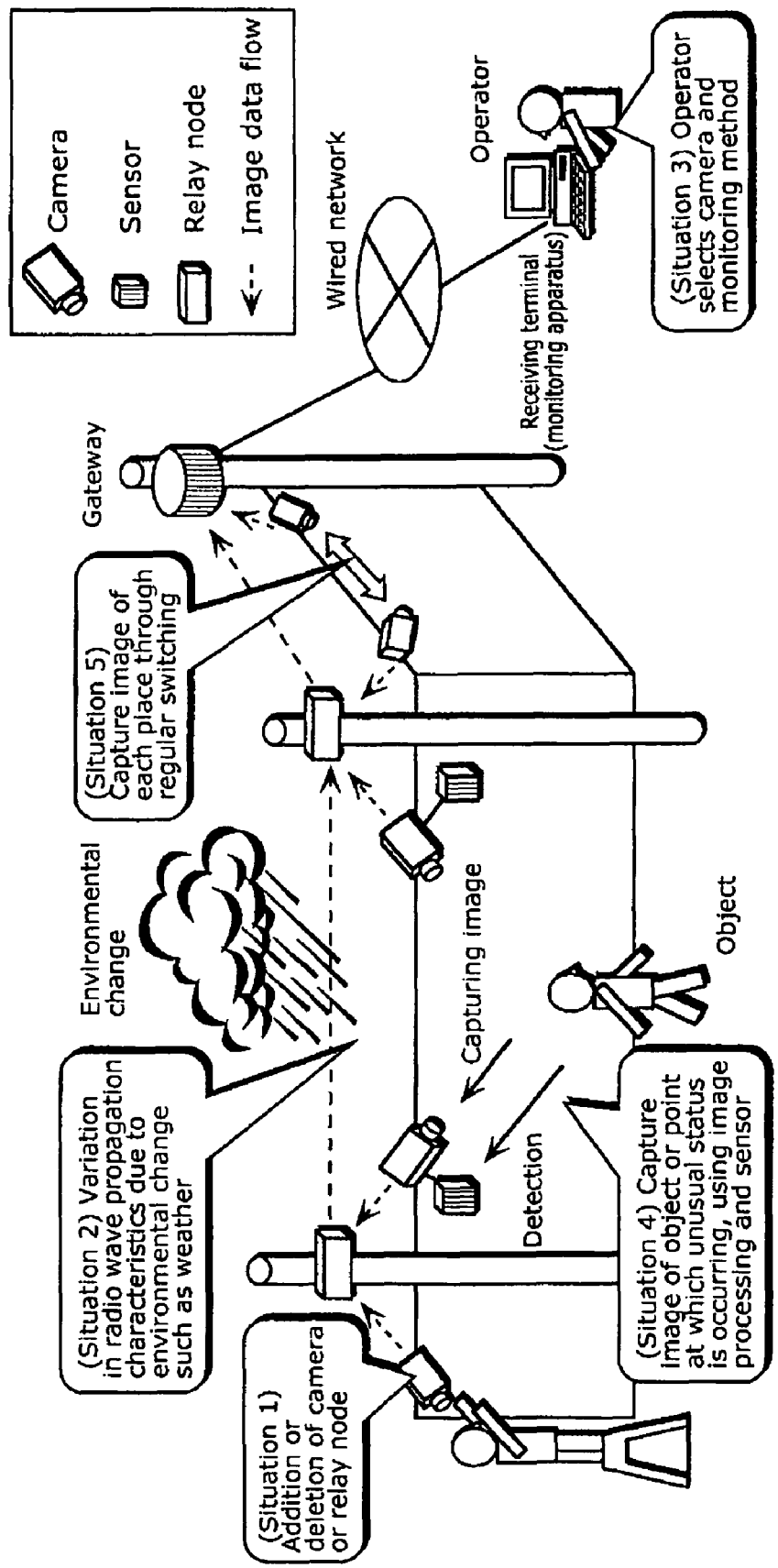
FIG. 24 is a diagram for describing an application in which the network control apparatus of the present invention is applied to a monitoring system.

FIG. 24 is a diagram for describing an application in which the network control apparatus of the present invention is applied to a monitoring system.

The network control apparatus of the present invention as a monitoring system is assumed to be used for the real-time shooting of a wide area using plural cameras, such as: indoor surveillance at a building, a shopping mall, and so on, and outdoor surveillance at a shopping street, a park, and so on.

Here, as shown in FIG. 24, a monitoring system intended for watching people (children, elders, and so on) in a school zone, a shopping street, and so on, as well as watching a point at which an unusual status is occurring (suspicious people and accidents) shall be described.

The relay nodes making up the monitoring system are installed on signboards, outdoor lights, electric poles, traffic signs, traffic lights, and so on within an area to be watched and communicate with each other wirelessly. In addition, a part of the relay nodes are connected to a wired network and have a function as a gateway.

Cameras are installed on walls, signboards, outdoor lights, electric poles, traffic signs, traffic lights, and so on, on the route on which a (human) object moves, and distribute images to the gateway through a nearest relay node.

In addition, in this application, each of the cameras is assumed to be able to judge, cooperatively with image processing, a sensor, and so on, whether or not the (human) object is present in the image captured by the camera. Other possible methods for judging the presence or absence of the (human) object through image processing include: a background subtraction method in which an image captured when the object is present is compared with an image captured when the object is not present, and a template matching method in which a detected image of the object is prepared as a template image so as to compare the captured image with the template. In addition, as a method for detecting the object by using the sensor, it is possible to assume a method for judging whether or not the object, carrying an RFID tag, is present within a predetermined monitoring area.

The image captured by each camera is sent from the wireless ad-hoc network to the wired network through the gateway, to be delivered to the monitor of a monitoring operator.

Figure 25:
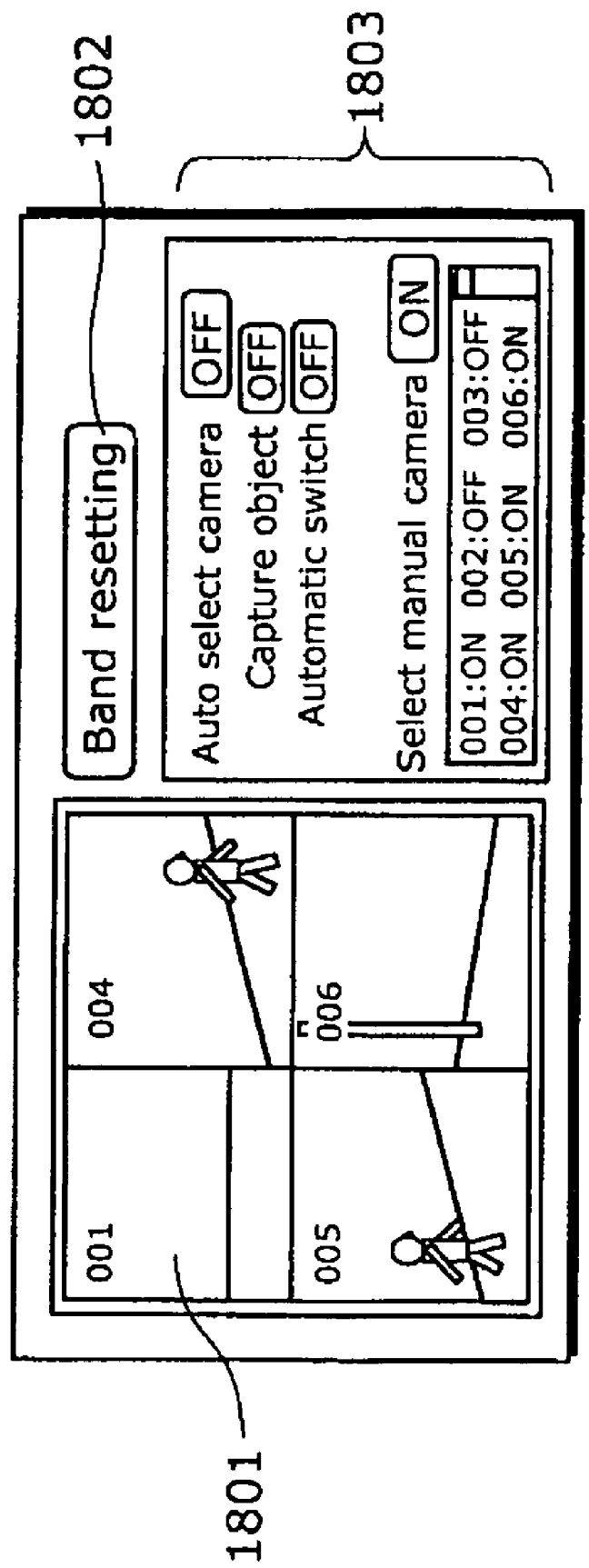
FIG. 25 is a diagram showing an example of an operational GUI of the monitoring apparatus.

FIG. 25 is a diagram showing an example of an operational GUI of the monitoring apparatus for controlling the network control apparatus on the operator's side.

The operational GUI includes, besides the display screen 1801 for displaying images sent from the cameras: a band resetting button 1802 for re-setting the band, and a control panel 1803 for selecting the mode for switching between camera images, that is, whether the switching is automatically performed by the monitoring system or manually performed by the operator.

The method of automatically selecting the camera includes: obtaining images by automatically selecting, by use of image processing and the sensor, only a camera capturing the object, and switching among the cameras from which to obtain images at regular time intervals in order to cruise around the shooting location. In these methods, it is possible to perform automatic camera selection through the operation panel 1803.

In the monitoring system using the wireless ad-hoc network, the situations below can be assumed as situations requiring fair and efficient allocation of the transmission band for the route from each terminal to the gateway.

(Situation 1) the case where a camera or a relay node is added or deleted for maintenance or system expansion.

(Situation 2) the case where radio propagation characteristics vary due to influence of environmental change such as weather.

(Situation 3) the case where the operator selects the camera from which to obtain an image and the monitoring method.

(Situation 4) the case where only cameras shooting a place where the object is present or an unusual status is occurring distribute images to the operator.

(Situation 5) the case where the operator switches among the cameras that distribute images in order to display, by switching, the images of different locations at regular time intervals.

In any one of the cases from (Situation 1) to (Situation 5), triggered by the change in the routing information caused by the switching of images distributed from the cameras, the network control apparatus of the present invention estimates the bottleneck on the transmission path and allocates the transmission band to the respective cameras (terminals).

Alternatively, other than the change in the routing information, in the cases of (Situation 1) and (Situation 2), the operator may manually instruct, through the band resetting button 1802, the bottleneck estimating unit 411 of the gateway or the bottleneck estimating unit 412 of the terminal to perform resetting.

In addition, the band resetting button 1802 is provided not only in the operational GUI at the operator's side but also at the terminal, the relay node, and the gateway, and the resetting may also be performed by the provider that installs these apparatuses. This allows the operator to perform, where necessary, automatic allocation to each terminal of the transmission rate and the transmission band for the route to the relay node.

In the case of (Situation 3), the operational information instructed by the operator on the operation panel 1803 may be notified to the bottleneck estimating unit 411 of the gateway or the bottleneck estimating unit 412 of the terminal, as trigger information that triggers estimation of the bottleneck. This allows reliable estimation of the bottleneck and reallocation of the transmission band each time the operator selects the camera with which to display an image on the display screen 1801 or the monitoring method.

In the case of (Situation 4), information indicating that a new object or unusual status has been detected by image processing or a sensor of the camera may be notified to the bottleneck estimating unit 411 of the gateway or the bottleneck estimating unit 412 of the terminal, as trigger information that triggers estimation of the bottleneck on the transmission path. Even in the case where there is no change in the routing, this allows estimation of the bottleneck relay node and resetting of the band when there is any change in the object or the unusual status.

In the case of (Situation 5), since it is possible to specify the order and timing for switching the cameras, the trigger information for re-estimating the bottleneck may be previously notified to the bottleneck estimating unit 411 of the gateway or the bottleneck estimating unit 412 of the terminal according to the schedule for the switching of the cameras. This allows setting of the transmission rate for each terminal along with the switching of images.

As described thus far, in the situation requiring resetting of the transmission rate for each camera (terminal) and the allocation of the transmission band for the route up to the relay node, the monitoring system using the wireless ad-hoc network is allowed to perform automatic allocation that achieves fair and efficient allocation of the transmission rate between the respective sending terminals.

Note that the sending terminal in Application 1 may be a terminal other than a camera. For example, sound information obtained by use of a microphone, the detected status of a human, the weather, air temperature, or the like detected by a human sensor, a temperature sensor, or the like may also be notified.

In addition, the monitoring apparatus may also include a speaker for reproducing the sound information, or may also display the sensor information on the display screen 1801.

<Application 2>

Figure 26:
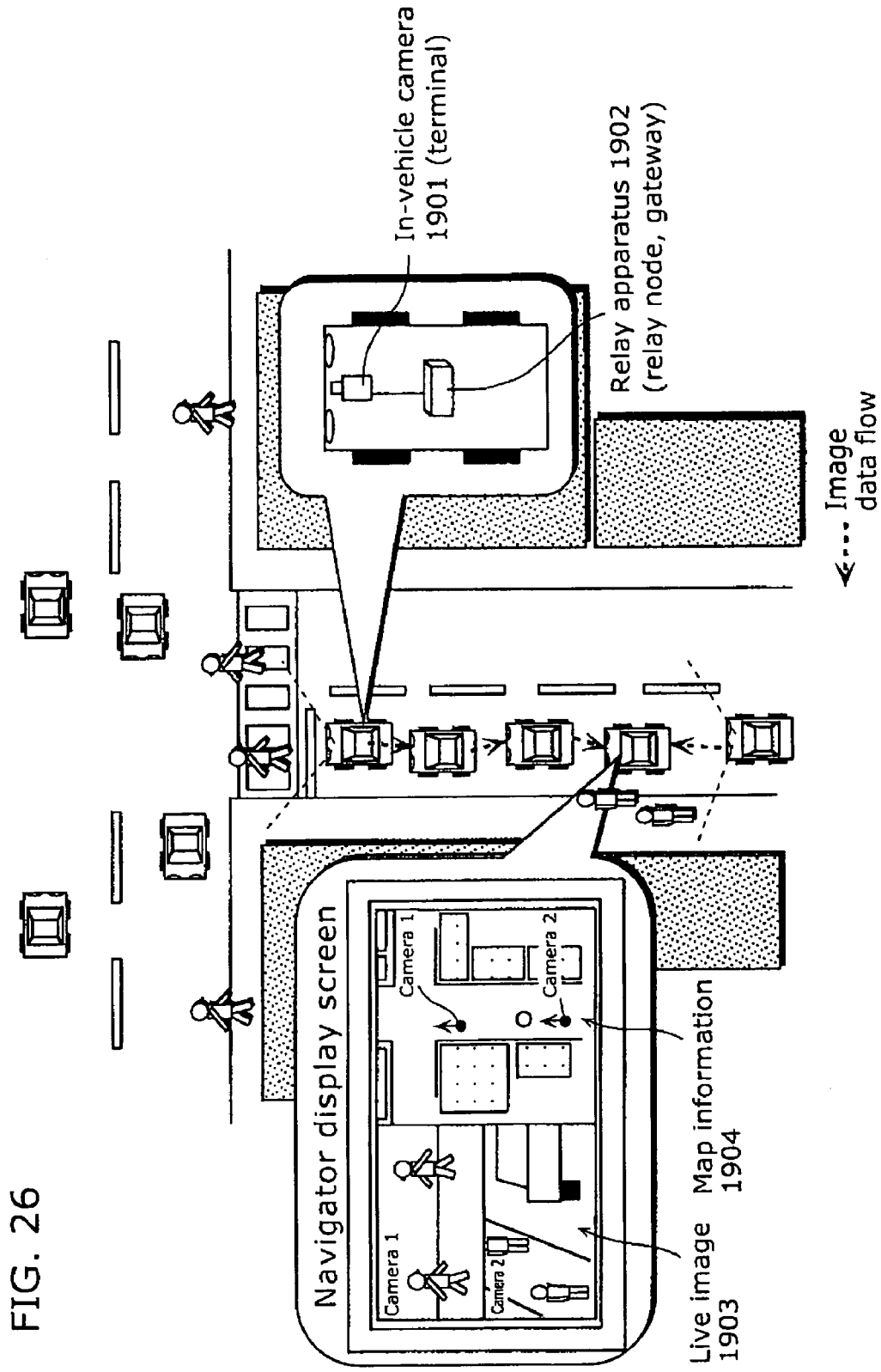
FIG. 26 is a diagram for describing an application in which the network control apparatus of the present invention is applied to an in-vehicle camera.

FIG. 26 is a diagram for describing an application in which the network control apparatus of the present invention is applied to an in-vehicle camera.

Each vehicle is equipped with an in-vehicle camera (terminal) 1901 and a relay apparatus (relay node; gateway) 1902 having the functions equivalent to the functions of the network control apparatus of the present invention. Note that the in-vehicle camera 1901 and the relay apparatus 1902 equipped on the vehicle may be connected wiredly or wirelessly.

In addition, the navigator of the vehicle has a function to display the position and image of the in-vehicle camera obtained from another vehicle.

Generally, each time the road or intersection at which the vehicles wait at stoplights is changed, alignment order of vehicles or inter-vehicle distance changes, causing a change of the vehicle that is to be the bottleneck on the transmission path, and thus necessitating the resetting of the transmission rate for each camera after each change.

In response to the switching of relay vehicles as described above, a vehicle equipped with the network control apparatus of the present invention performs automatic reallocation of the transmission rate for the vehicle camera 1901, based on the update of the routing information as a result of the change in the alignment order of vehicles and inter-vehicle distance.

The application in FIG. 26 shows an example in which: in the situation where plural vehicles are waiting at stoplights at an intersection or the like, a picture of an intersection ahead or a picture of a pedestrian approaching from behind is obtained using the wireless ad-hoc network, and the image and the position at which the image is captured are displayed on the navigator screen.

The application in FIG. 26 shows an example in which the image of the vehicle at the head of the vehicles waiting at the stoplights and the image behind the vehicle are obtained to be displayed. As is evident, however, it is possible to obtain, so as to display, an image from the in-vehicle camera of another vehicle (for example, a vehicle stopped in front waiting to turn right).

Thus, even in inter-vehicle communication in which the switching of relay nodes (relay apparatuses) frequently occurs, it is possible, by using the network control apparatus of the present invention, to follow changes in the situations of the vehicles around, and to automatically reset the transmission rate that allows fair and efficient obtainment of an image from the in-vehicle camera 1901 of another vehicle.

Note that the sending terminal in Application 2 may be a terminal other than a camera. For example, sound information using an IP phone or obstacle information using an in-vehicle sensor (obstacle detection) is also applicable.

In addition, the display interface of the navigator may include a speaker that reproduces sound information that is transmitted, or may display the sensor information along with a live image 1903 or map information 1904.

INDUSTRIAL APPLICABILITY

The present invention can be used as a network control apparatus, particularly as a network control apparatus which allocates an appropriate transmission band to plural terminals connected to a wireless ad-hoc network prior to transmission of the traffic.

The invention claimed is:

1. A network control apparatus controlling, in an ad-hoc network structured with a terminal apparatus, a relay apparatus, and a gateway apparatus connected to each other through data links, the ad-hoc network through which data is transferred from the terminal apparatus to the gateway apparatus via the relay apparatus, wherein routing in the ad-hoc network is established using routing information including information regarding a transmission error rate at each of the data links, and said network control apparatus comprises:

a routing processing unit configured to obtain, from the routing information, information regarding a relationship between data links in connecting relay apparatuses on a path and information regarding the transmission error rate at each of the data links; and a bottleneck estimating unit configured to estimate a relay apparatus as a bottleneck candidate from among the relay apparatuses, the relay apparatus having a data link through which the data is transmitted and at which the transmission error rate is higher than the transmission error rate at a data link through which the data is received.

2. The network control apparatus according to claim 1, wherein when the gateway apparatus collects a transmission speed at each of the relay apparatuses, said bottleneck estimating unit is configured to narrow down, when the routing information is changed, relay apparatuses estimated as bottleneck candidates, by selecting a relay apparatus at which the transmission speed has decreased after the change as compared to the transmission speed before the change.

3. The network control apparatus according to claim 1, wherein when the gateway apparatus detects that the routing information has been changed, said bottleneck estimating unit is configured to perform re-estimation, only on a relay apparatus related to the routing information that has been changed, as to whether or not the relay apparatus can be the bottleneck candidate.

4. The network control apparatus according to claim 1, further comprising:

an effective band measuring unit configured to measure an effective band that is a communication band allowing transmission of the data from the relay apparatus estimated as the bottleneck candidate to the gateway apparatus; and a band allocation determining unit configured to determine, by dividing the measured effective band, a transmission band to be allocated to one or more other terminal apparatuses from which the relay apparatus relays the data.

5. The network control apparatus according to claim 4, wherein when the gateway apparatus detects that the routing information has been changed, and when the gateway apparatus detects that a terminal has been added to or deleted from the ad-hoc network, said band allocation determining unit is configured to re-determine the transmission band by using the routing information after the change.

6. The network control apparatus according to claim 5, wherein said effective band measuring unit is provided in the gateway, said band allocation determining unit is provided in the terminal apparatus, and is configured to determine a transmission band to be allocated to one or more other terminal apparatuses from which the data is relayed by a same relay apparatus that relays the data from the terminal apparatus, by obtaining, from the gateway apparatus, the effective band measured by said effective band measuring unit and dividing the obtained effective band.

7. A gateway apparatus controlling an ad-hoc network which is structured with terminal apparatuses, relay apparatuses, and a gateway apparatus connected to each other through data links, and through which data is transferred from each of the terminal apparatuses to the gateway apparatus via the relay apparatuses, wherein routing in the ad-hoc network is established using routing information including information regarding a transmission error rate, which is local, within the ad-hoc network, and said gateway apparatus comprises:

a routing processing unit configured to obtain, from the routing information used for establishing the routing, information regarding a relationship between data links in connecting relay apparatuses on a path and the transmission error rate at each of the data links; and a bottleneck estimating unit configured to estimate a relay apparatus as a bottleneck candidate from among the relay apparatuses, the relay apparatus having a data link through which the data is transmitted and at which the transmission error rate is higher than the transmission error rate at a data link through which the data is received.

8. A method of controlling an ad-hoc network which is structured with terminal apparatuses, relay apparatuses, and a gateway apparatus connected to each other through data links, and through which data is transferred from each of the terminal apparatuses to the gateway apparatus via the relay apparatuses, wherein routing in the ad-hoc network is established using routing information including information regarding a transmission error rate, which is local, within the ad-hoc network, and said control method comprises:

obtaining, from the routing information used for establishing the routing, information regarding a relationship between data links in connecting relay apparatuses on a path and the transmission error rate at each of the data links; and estimating a relay apparatus as a bottleneck candidate from among the relay apparatuses, the relay apparatus having a data link through which the data is transmitted and at which the transmission error rate is higher than the transmission error rate at a data link through which the data is received.

9. A computer program for controlling an ad-hoc network which is structured with terminal apparatuses, relay apparatuses, and a gateway apparatus connected to each other through data links, and through which data is transferred from each of the terminal apparatuses to the gateway via the relay apparatuses, wherein routing in the ad-hoc network is established using routing information regarding a local transmission error rate within the ad-hoc network, and said computer program causes a computer to execute:

obtaining, from the routing information used for establishing the routing, information regarding a relationship between data links in connecting relay apparatuses on a path and the transmission error rate at each of the data links; and estimating a relay apparatus as a bottleneck candidate from among the relay apparatuses, the relay apparatus having a data link through which the data is transmitted and at which the transmission error rate is higher than the transmission error rate at a data link through which the data is received.

10. A network control apparatus controlling, in an ad-hoc network structured at least with a terminal apparatus and a relay apparatus connected to each other through data links, the ad-hoc network through which data is transferred from the terminal apparatus via the relay apparatus, said network control apparatus comprising:

a routing processing unit configured to obtain, from routing information including information regarding a transmission error rate at each of the data links, information regarding a relationship between data links in connecting relay apparatuses on a path and information regarding transmission error rate at each of the data links; and a bottleneck estimating unit configured to estimate a relay apparatus as a bottleneck candidate from among the relay apparatuses, the relay apparatus having a data link through which the data is transmitted and at which the transmission error rate is higher than the transmission error rate at a data link through which the data is received.

* * * * *